(12) United States Patent
Granovetter et al.

(10) Patent No.: US 7,283,850 B2
(45) Date of Patent: Oct. 16, 2007

(54) METHOD AND APPARATUS FOR MULTI-SENSORY SPEECH ENHANCEMENT ON A MOBILE DEVICE

(75) Inventors: Randy Phyllis Granovetter, Kirkland, WA (US); Michael J. Sinclair, Kirkland, WA (US); Zhengyou Zhang, Bellevue, WA (US); Zicheng Liu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 50 days.

(21) Appl. No.: 10/962,954

(22) Filed: Oct. 12, 2004

(65) Prior Publication Data

US 2006/0079291 A1     Apr. 13, 2006

(51) Int. Cl.
 *H04B 1/38* (2006.01)
(52) U.S. Cl. ............ 455/570; 455/550.1; 455/67.13; 381/92; 381/122; 704/228
(58) Field of Classification Search ............... 455/563, 455/63.1, 557, 185, 570, 550.1, 67.13; 386/124, 386/125; 370/332; 379/40; 704/260, 228; 381/94.7, 92, 122
See application file for complete search history.

(56) References Cited

U.S. PATENT DOCUMENTS

| | | | |
|---|---|---|---|
| 3,383,466 A | 5/1968 | Hilix et al. ............... 179/1 |
| 3,746,789 A | 7/1973 | Alcivar ....................... 179/1 |
| 3,787,641 A | 1/1974 | Santori ..................... 179/107 |
| 5,054,079 A | 10/1991 | Frielingsdorf et al. ...... 381/151 |
| 5,151,944 A | 9/1992 | Yamamura ................. 381/151 |
| 5,197,091 A | 3/1993 | Takagi et al. .......... 379/433.12 |
| 5,295,193 A | 3/1994 | Ono ........................ 381/151 |
| 5,404,577 A | 4/1995 | Zuckerman et al. .......... 455/66 |
| 5,446,789 A | 8/1995 | Loy et al. |
| 5,555,449 A | 9/1996 | Kim ..................... 379/433.03 |
| 5,647,834 A | 7/1997 | Ron ............................ 600/23 |
| 5,692,059 A | 11/1997 | Kruger ....................... 381/151 |
| 5,757,934 A | 5/1998 | Yokoi ........................ 381/68.3 |
| 5,828,768 A | 10/1998 | Eatwell et al. .............. 381/333 |
| 5,873,728 A | 2/1999 | Jeong ........................ 434/185 |
| 5,933,506 A | 8/1999 | Aoki et al. .................. 381/151 |
| 5,943,627 A | 8/1999 | Kim et al. ................... 379/426 |
| 5,983,073 A | 11/1999 | Ditzik ........................ 455/11.1 |
| 6,028,556 A | 2/2000 | Shiraki ....................... 343/702 |
| 6,052,464 A | 4/2000 | Harris et al. ................ 379/433 |
| 6,052,567 A | 4/2000 | Ito et al. ...................... 455/90 |
| 6,091,972 A | 7/2000 | Ogasawara ............... 455/575.7 |
| 6,094,492 A | 7/2000 | Boesen ....................... 381/312 |
| 6,125,284 A | 9/2000 | Moore et al. ............... 455/557 |
| 6,137,883 A | 10/2000 | Kaschke et al. ....... 379/433.07 |
| 6,175,633 B1 | 1/2001 | Morrill et al. ............. 381/71.6 |
| 6,243,596 B1 | 6/2001 | Kikinis ......................... 429/8 |

(Continued)

FOREIGN PATENT DOCUMENTS

DE     199 17 169     11/2000

(Continued)

OTHER PUBLICATIONS

U.S. Appl. No. 10/629,278, filed Jul. 29, 2003, Huang et al.

(Continued)

*Primary Examiner*—Lester G. Kincaid
*Assistant Examiner*—Fred Casca
(74) *Attorney, Agent, or Firm*—Theodore M. Magee; Westman, Champlin & Kelly, P.A.

(57) ABSTRACT

A mobile device includes an air conduction microphone and an alternative sensor that provides an alternative sensor signal indicative of speech. A communication interface permits the mobile device to communicate directly with other mobile devices.

32 Claims, 17 Drawing Sheets

U.S. PATENT DOCUMENTS

| | | | | |
|---|---|---|---|---|
| 6,308,062 | B1 | 10/2001 | Chien et al. | 455/420 |
| 6,339,706 | B1 | 1/2002 | Tillgren et al. | 455/419 |
| 6,343,269 | B1 | 1/2002 | Harada et al. | 704/243 |
| 6,408,081 | B1 | 6/2002 | Boesen | 381/312 |
| 6,411,933 | B1 | 6/2002 | Maes et al. | 704/273 |
| 6,542,721 | B2 | 4/2003 | Boesen | 455/90 |
| 6,560,468 | B1 | 5/2003 | Boesen | 455/568 |
| 6,594,629 | B1 | 7/2003 | Basu et al. | 704/251 |
| 6,664,713 | B2 | 12/2003 | Boesen | 310/328 |
| 6,675,027 | B1* | 1/2004 | Huang | 455/575.1 |
| 6,760,600 | B2 | 7/2004 | Nickum | 455/557 |
| 7,054,423 | B2* | 5/2006 | Nebiker et al. | 379/201.01 |
| 2001/0027121 | A1 | 10/2001 | Boesen | 455/556 |
| 2001/0039195 | A1 | 11/2001 | Nickum | 455/557 |
| 2002/0057810 | A1 | 5/2002 | Boesen | |
| 2002/0075306 | A1 | 6/2002 | Thompson et al. | |
| 2002/0181669 | A1 | 12/2002 | Takatori et al. | |
| 2002/0196955 | A1 | 12/2002 | Boesen | |
| 2002/0198021 | A1 | 12/2002 | Boesen | 455/556 |
| 2003/0083112 | A1 | 5/2003 | Fukuda | 455/568 |
| 2003/0125081 | A1 | 7/2003 | Boesen | 455/556 |
| 2003/0144844 | A1 | 7/2003 | Colmenarez et al. | 704/273 |
| 2004/0092297 | A1 | 5/2004 | Huang | |
| 2005/0114124 | A1* | 5/2005 | Liu et al. | 704/228 |
| 2006/0008258 | A1* | 1/2006 | Khedouri et al. | 386/124 |
| 2006/0009156 | A1* | 1/2006 | Hayes et al. | 455/63.1 |

FOREIGN PATENT DOCUMENTS

| | | |
|---|---|---|
| EP | 0 720 338 A2 | 7/1996 |
| EP | 0 854 535 A2 | 7/1998 |
| EP | 0 939 534 A1 | 9/1999 |
| EP | 0 951 883 | 10/1999 |
| EP | 1 333 650 | 8/2003 |
| EP | 1 569 422 | 8/2005 |
| FR | 2 761 800 | 4/1997 |
| GB | 2 375 276 | 11/2002 |
| GB | 2 390 264 | 12/2003 |
| JP | 3108997 | 5/1991 |
| JP | 5276587 | 10/1993 |
| JP | 8065781 | 3/1996 |
| JP | 8070344 | 3/1996 |
| JP | 8079868 | 3/1996 |
| JP | 10-023122 | 1/1998 |
| JP | 10-023123 | 1/1998 |
| JP | 11265199 | 9/1999 |
| JP | 2000-209688 | 7/2000 |
| JP | 2000196723 | 7/2000 |
| JP | 2000261529 | 9/2000 |
| JP | 2000261530 | 9/2000 |
| JP | 2000261534 | 9/2000 |
| JP | 2000354284 | 12/2000 |
| JP | 2001119797 | 4/2001 |
| JP | 2001245397 | 9/2001 |
| JP | 20012924989 | 10/2001 |
| JP | 2002-125298 | 4/2002 |
| JP | 2002-358089 | 12/2002 |
| WO | WO93/01664 | 1/1993 |
| WO | WO95/17746 | 6/1995 |
| WO | WO 00/21194 | 10/1998 |
| WO | WO99/04500 | 1/1999 |
| WO | WO 00/45248 | 8/2000 |
| WO | WO 02/077972 A1 | 10/2002 |
| WO | WO 02/098169 A1 | 12/2002 |
| WO | WO 03/055270 A1 | 7/2003 |

OTHER PUBLICATIONS

U.S. Appl. No. 10/785,768, filed Feb. 24, 2004, Sinclair et al.
U.S. Appl. No. 10/636,176, filed Aug. 7, 2003, Huang et al.
Zheng Y. et al., "Air and Bone-Conductive Integrated Microphones for Robust Speech Detection and Enhancement" Automatic Speech Recognition and Understanding 2003. pp. 249-254.
De Cuetos P. et al. "Audio-visual intent-to-speak detection for human-computer interaction" vol. 6, Jun. 5, 2000. pp. 2373-2376.
M. Graciarena, H. Franco, K. Sonmez, and H. Bratt, "Combining Standard and Throat Microphones for Robust Speech Recognition," IEEE Signal Processing Letters, vol. 10, No. 3, pp. 72-74, Mar. 2003.
P. Heracleous, Y. Nakajima, A. Lee, H. Saruwatari, K. Shikano, "Accurate Hidden Markov Models for Non-Audible Murmur (NAM) Recognition Based on Iterative Supervised Adaptation," ASRU 2003, St. Thomas, U.S. Virgin Islands, Nov. 20-Dec. 4, 2003.
O.M. Strand, T. Holter, A. Egeberg, and S. Stensby, "On the Feasibility of ASR in Extreme Noise Using the PARAT Earplug Communication Terminal," ASRU 2003, St. Thomas, U.S. Virgin Islands, Nov. 20-Dec. 4, 2003.
Z. Zhang, Z. Liu, M. Sinclair, A. Acero, L. Deng, J. Droppo, X. D. Huang, Y. Zheng, "Multi-Sensory Microphones For Robust Speech Detection, Enchantment, and Recognition," ICASSP 04, Montreal, May 17-21, 2004.
http://www.snaptrack.com/ (2004).
http://www.misumi.com.tw/PLIST.ASP?PC.ID:21 (2004).
http://www.wherifywireless.com/univLoc.asp (2001).
http://www.wherifywireless.com/prod.watches.htm (2001).
Microsoft Office, Live Communications Server 2003, Microsoft Corporation, pp. 1-10, 2003.
Shoshana Berger, http://www.cnn.com/technology, "Wireless, wearable, and wondrous tech," Jan. 17, 2003.
http://www.3G.co.uk, "NTT DoCoMo to Introduce First Wireless GPS Handset," Mar. 27, 2003.
"Physiological Monitoring System 'Lifeguard' System Specifications," Stanford University Medical Center, National Biocomputation Center, Nov. 8, 2002.
Nagl, L., "Wearable Sensor System for Wireless State-of-Health Determination in Cattle," Annual International Conference of the Institute of Electrical and Electronics Engineers' Engineering in Medicine and Biology Society, 2003.
Asada, H. and Barbagelata, M., "Wireless Fingernail Sensor for Continuous Long Term Health Monitoring," MIT Home Automation and Healthcare Consortium, Phase 3, Progress Report No. 3-1, Apr. 2001.
Kumar, V., "The Design and Testing of a Personal Health System to Motivate Adherence to Intensive Diabetes Management," Harvard-MIT Division of Health Sciences and Technology, pp. 1-66, 2004.
Search Report dated Dec. 17, 2004 from International Application No. 04016226.5.
European Search Report from Application No. 05107921.8, filed Aug. 30, 2005.
http://www.snaptrack.com/ (2004), no month listed.
http://www.misumi.com.tw/PLIST.ASP?PC.ID:21 (2004), no month listed.
http://www.wherifywireless.com/univLoc.asp (2001), no month listed.
http://www.wherifywireless.com/prod.watches.htm (2001), no month listed.
Microsoft Office, Live Communications Server 2003, Microsoft Corporation, pp. 1-10, 2003, no month listed.
Nagl, L., "Wearable Sensor System for Wireless State-of-Health Determination in Cattle," Annual International Conference of the Institute of Electrical and Electronics Engineers' Engineering in Medicine and Biology Society, 2003, no month listed.
Kumar, V., "The Design and Testing of a Personal Health System to Motivate Adherence to Intensive Diabetes Management," Harvard-MIT Division of Health Sciences and Technology, pp. 1-66, 2004, no month listed.
European Search Report from Application No. 05108871.4, filed Sep. 26, 2005.
Bakar, "the Insight of Wireless Communication," Research and Development, 2002, Student Conference on Jul. 16-17, 2002.

* cited by examiner

METHOD AND APPARATUS FOR MULTI-SENSORY SPEECH ENHANCEMENT ON A MOBILE DEVICE

BACKGROUND OF THE INVENTION

The present invention relates to mobile devices. In particular, the present invention relates to multi-sensory mobile devices.

Mobile hand-held devices such as mobile phones and personal digital assistants that provide phone functions or accept speech input are often used in adverse noise environments such as busy streets, restaurants, airports, and cars. The strong ambient noise in these environments can obscure the user's speech and make it difficult to understand what the person is saying. In addition, it severely degrades speech recognition accuracy.

While noise filtering systems have been developed that attempt to remove noise based on a model of the noise, these systems have not been able to remove all of the noise. In particular, many of these systems have found it difficult to remove noise that consists of other people speaking in the background. One reason for this is that it is extremely difficult, if not impossible, for these systems to determine that a speech signal received by a microphone came from someone other than the person using the mobile device.

For phone headsets, which are kept in position on the user's head by looping the headset over the user's head or ear, systems have been developed that provide more robust noise filtering by relying on additional types of sensors in the headset. In one example, a bone conduction sensor is placed on one end of the head set and is pressed into contact with the skin covering the users skull, ear, or mandible by the resilience of the headset. The bone conduction sensor detects vibrations in the skull, ear or mandible that are created when the user speaks. Using the signal from the bone conduction sensor, this system is able to better identify when the user is speaking and as a result is better able to filter noise in the speech signal.

Although such systems work well for headsets, headsets have been limited to communicating along a wired connection to a phone. As such, their use in broader communication applications is limited. In addition, a headset is visually unattractive (big and bulky) as well as uncomfortable to wear for all day and as a result, users are unlikely to want to leave them in place during the day. This makes headsets cumbersome to use.

SUMMARY OF THE INVENTION

A mobile device is provided that includes an air conduction microphone and an alternative sensor that provides an alternative sensor signal indicative of speech. A communication interface permits the mobile device to communicate directly with other mobile devices.

DETAILED DESCRIPTION OF ILLUSTRATIVE EMBODIMENTS

Figure 1:
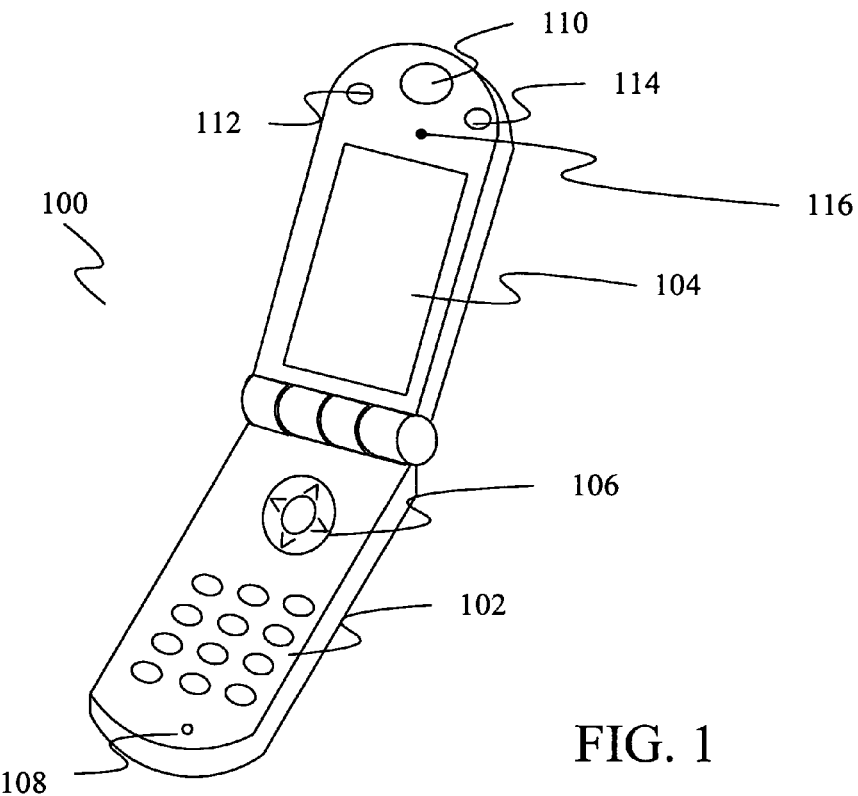
FIG. 1 is a perspective view of one embodiment of the present invention.

Embodiments of the present invention provide mobile devices that contain both an air conduction microphone and an alternative sensor that can be used in speech detection and noise filtering. Examples of mobile devices of the present invention include cellular phones, personal digital assistants, jewelry, and watches. FIG. 1 provides an example embodiment in which the mobile device is a mobile phone 100. Mobile phone 100 includes a key pad 102, a display 104, a cursor control 106, an air conduction microphone 108, a speaker 110, two bone-conduction microphones 112 and 114, and optionally a proximity sensor 116. Mobile phone 100 also includes a power source such as a battery, a processor, a global positioning satellite signal detector and processor, which are not visible from the exterior of the phone. Optionally, mobile phone 100 may also include a pulse sensor, an oximetry sensor, a temperature sensor, and a video camera.

Touchpad 102 allows the user to enter numbers and letters into the mobile phone. In other embodiments, touchpad 102 is combined with display 104 in the form of a touch screen. Cursor control 106 allows the user to highlight and select information on display 104 and to scroll through images and pages that are larger than display 104.

Figure 2:
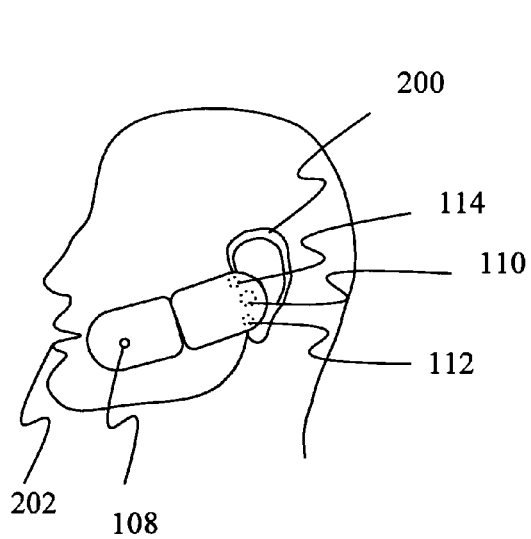
FIG. 2 shows the phone of FIG. 1 in position on the left side of a user's head.
Figure 3:
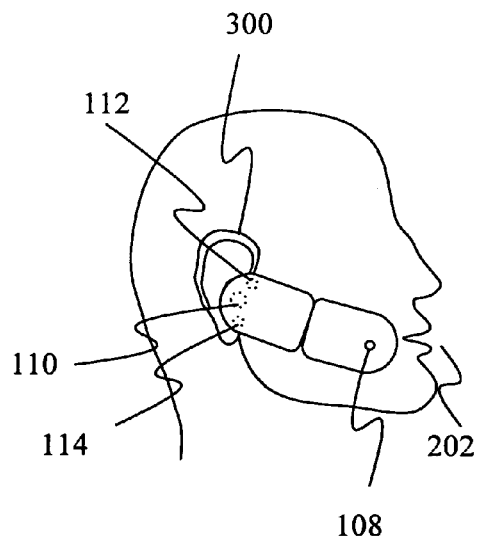
FIG. 3 shows the phone of FIG. 1 in position on the right side of a user's head.

As shown in FIGS. 2 and 3, when mobile phone 100 is put in the standard position for conversing over the phone, speaker 110 is positioned near the user's left ear 200 or right ear 300, and air conduction microphone 108 is positioned near the user's mouth 202. When the phone is positioned near the user's left ear, as in FIG. 2, bone conduction microphone 114 contacts the user's skull or ear and produces an alternative sensor signal that provides information about speech can be used to remove noise from the speech signal received by air conduction microphone 108. For example, the information provided in the alternative sensor signal can include whether the user is speaking as well as low frequency information related to the user's speech. When the phone is positioned near the user's right ear, as in FIG. 3, bone conduction microphone 112 contacts the user's skull or ear and produces an alternative sensor signal that can be used to remove noise from the speech signal.

The optional proximity sensor 116 indicates how close the phone is to the user. As discussed further below, this information is used to weight the contribution of the bone conduction microphones in producing the clean speech value. In general, if the proximity detector detects that the phone is next to the user, the bone conduction microphone signals are weighted more heavily than if the phone is some distance from the user. This adjustment reflects the fact that the bone conduction microphone signal is more indicative of the user speaking when it is in contact with the user. When it is apart from the user, it is more susceptible to ambient noise. The proximity sensor is used in embodiments of the present invention because users do not always hold the phone pressed to their heads.

Figure 4:
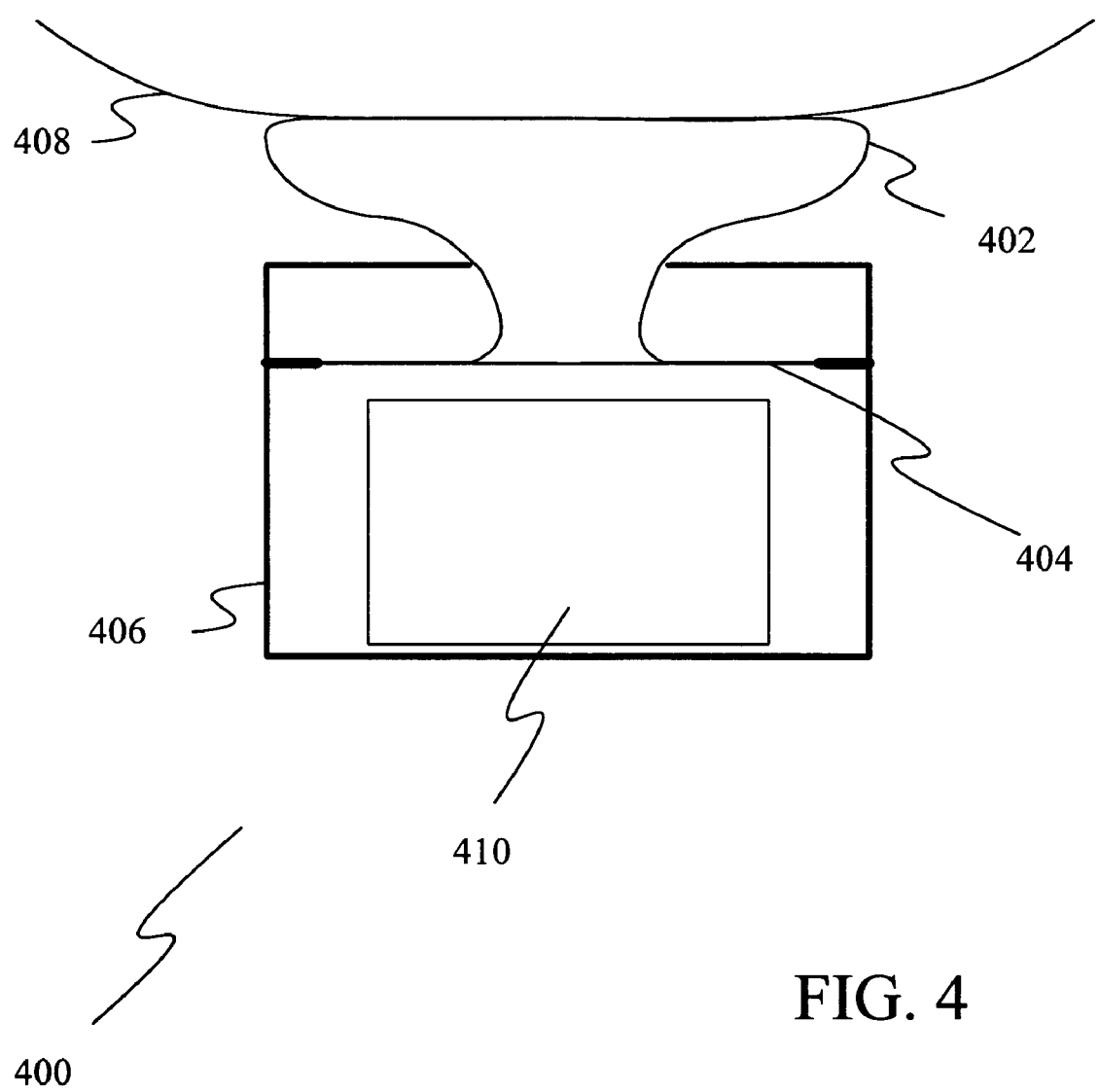
FIG. 4 is a block diagram of a bone conduction microphone.

FIG. 4 shows one embodiment of a bone conduction sensor 400 of the present invention. In sensor 400, a soft elastomer bridge 402 is adhered to a diaphragm 404 of a normal air conduction microphone 406. This soft bridge 402 conducts vibrations from skin contact 408 of the user directly to the diaphragm 404 of microphone 406. The movement of diaphragm 404 is converted into an electrical signal by a transducer 410 in microphone 406.

Figure 5:
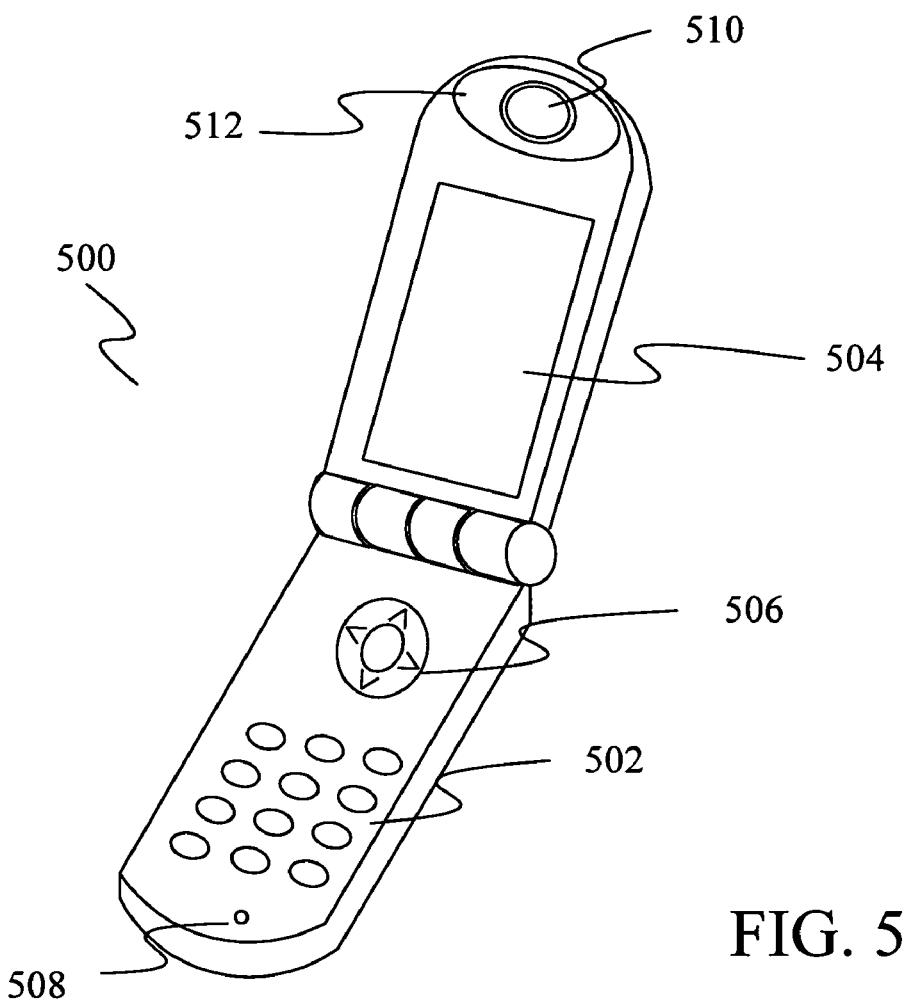
FIG. 5 is a perspective view of an alternative embodiment of the present invention.

FIG. 5 provides an alternative mobile phone embodiment 500 of the hand-held mobile device of the present invention. Mobile phone 500 includes a key pad 502, a display 504, a cursor control 506, an air conduction microphone 508, a speaker 510, and a combination bone-conduction microphone and proximity sensor 512.

Figure 6:
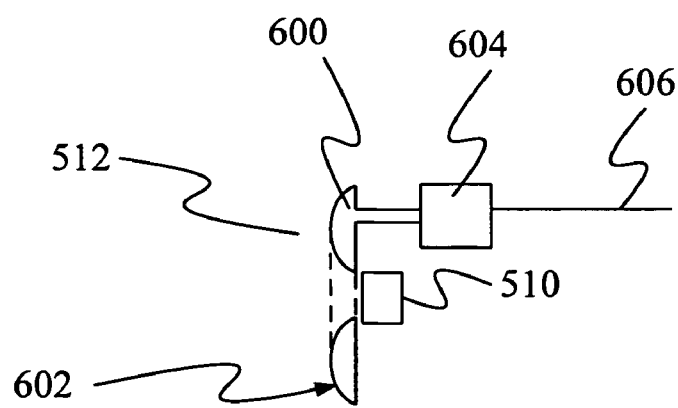
FIG. 6 is a cross-section of an alternative bone-conduction microphone under one embodiment of the present invention.

As shown in the cross-section of FIG. 6, combination of bone-conduction microphone and proximity sensor 512 consists of a soft, medium-filled (with fluid or elastomer) pad 600 that has an outer surface 602 designed to contact the user when the user places the phone against their ear. Pad 600 forms a ring around an opening that provides a passageway for sound from speaker 510, which is located in the opening or directly below the opening within phone 500. Pad 600 is not limited to this shape and any shape for the pad may be used. In general, however, it is preferred if pad 600 includes portions to the left and right of speaker 510 so that at least one part of pad 600 is in contact with the user regardless of which ear the user places the phone against. The portions of the pad may be externally continuous or may be externally separate but fluidly connected to each other within the phone.

An electronic pressure transducer 604 is hydraulically connected to the fluid or elastomer in pad 600 and converts the pressure of the fluid in pad 600 into an electrical signal on conductor 606. Examples of electronic pressure transducer 604 include MEMS-based transducers. In general, pressure transducer 604 should have a high frequency response.

The electrical signal on conductor 606 includes two components, a DC component and an AC component. The DC component provides a proximity sensor signal because the static pressure within pad 600 will by higher when the phone is pressed against the user's ear than when the phone is some distance from the user's ear. The AC component of the electrical signal provides a bone-conduction microphone signal because vibrations in the bones of the user's skull, jaw or ear create fluctuations in pressure in pad 600 that are converted into an AC electrical signal by pressure transducer 604. Under one embodiment, a filter is applied to the electrical signal to allow the DC component of the signal and AC components above a minimum frequency to pass.

Although two examples of bone conduction sensors have been described above, other forms for the bone conduction sensor are within the scope of the present invention.

Figure 7:
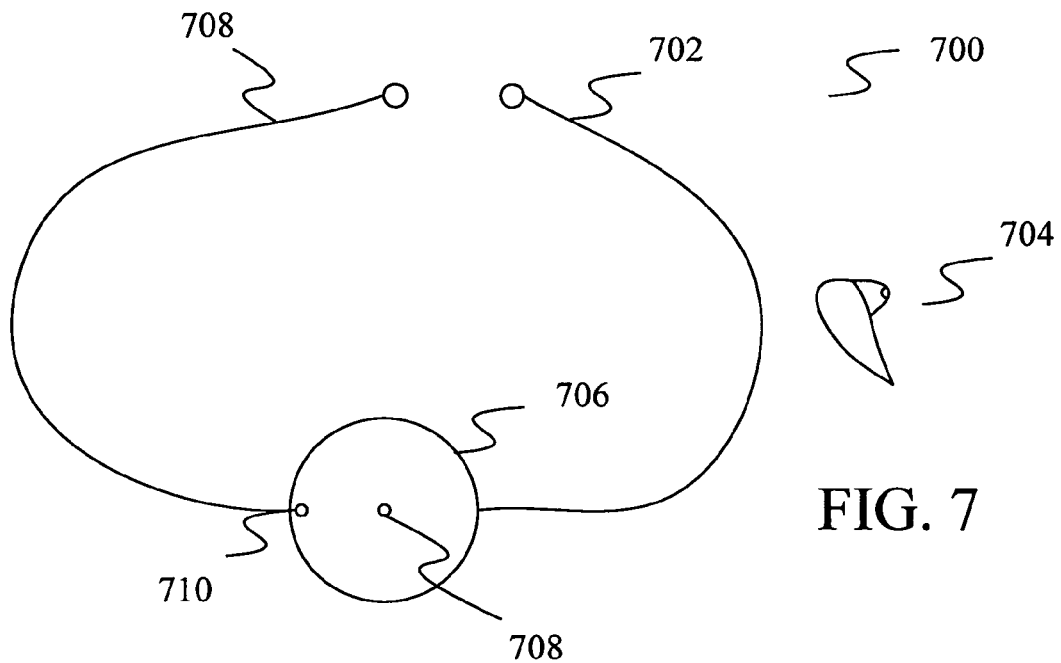
FIG. 7 is a front view of a necklace embodiment of a mobile device of the present invention.
Figure 8:
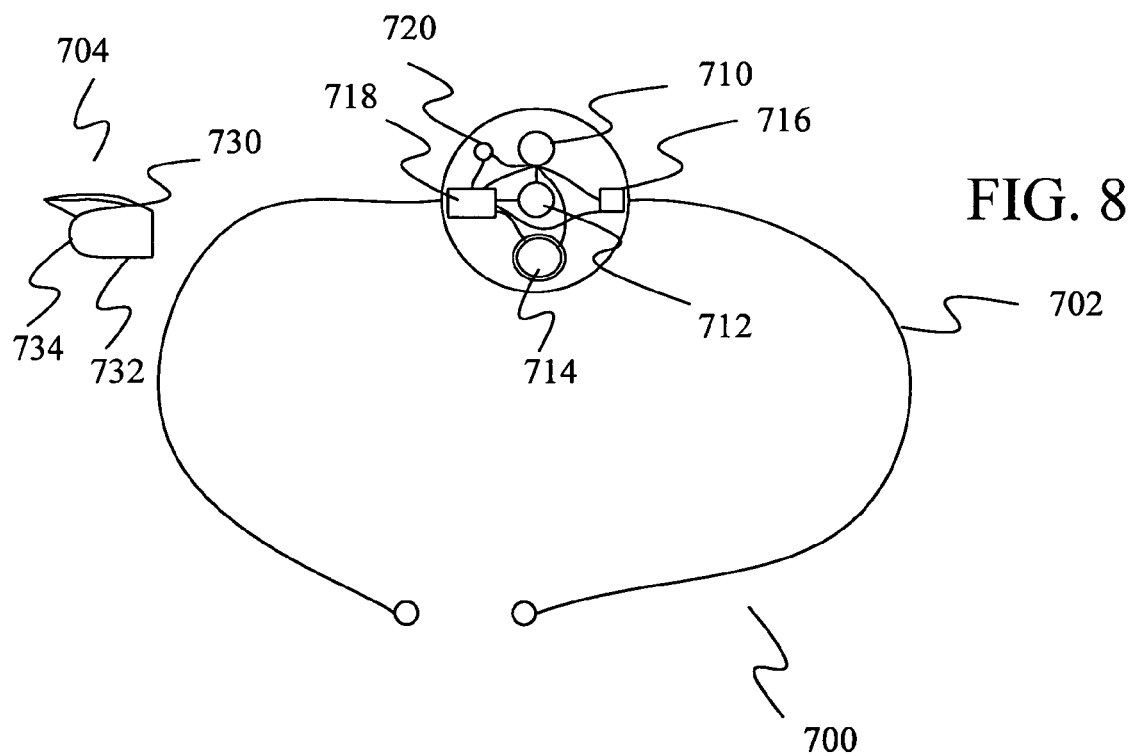
FIG. 8 is a back view of the necklace embodiment of FIG. 7.

FIGS. 7 and 8 show a front view and a back view of an alternative embodiment of a mobile device under the present invention. In FIGS. 7 and 8, mobile device 700 consists of a necklace or choker 702 and an ear bud 704. Necklace 702 includes a decorative/ornamental disk or pendant 706 that is suspended from a neck engaging piece 708, such as a string or a wire. The neck engaging piece supports the mobile device on the user and is designed to be attached around a user's neck. Decorative disk 706 includes a microphone opening 708 and a video opening 710.

As shown from the back view of FIG. 8, mobile device 700 includes a battery 710, which powers an air conduction microphone 712, an alternative sensor 714, a video camera 716, a processing chip set 718, and a global positioning satellite (GPS) receiver 720. Processing chip set 718 is connected to air conduction microphone 712, alternative sensor 714, video camera 716, and GPS receiver 720. Processing chip set 718 includes a processor, memory storage, and input/output interface and a communication interface. The communication interface allows the processor to communicate with a processor within ear bud 704, allowing the processor in processing chip set 718 to transmit electrical signals representing acoustic information to ear bud 704. The communication interface of processing chip set 718 may also wirelessly communicate with a collection of other devices, including a video display, a personal computer, a router, and other mobile devices. The protocol used for these communications can include any known protocol, including any variations of the 802.11 protocol.

Ear bud 704 includes outer portion 730, ear canal portion 732, and speaker opening 734. Ear bud 704 receives a signal from processing chip set 718 and converts that signal into an auditory signal through a speaker that is internal to ear bud 704. This auditory signal exits through speaker opening 734 into the user's ear. Ear bud 704 includes a battery (not shown) and a communication interface that allows it to communicate with the communication interface of processing chip set 718.

Figure 9:
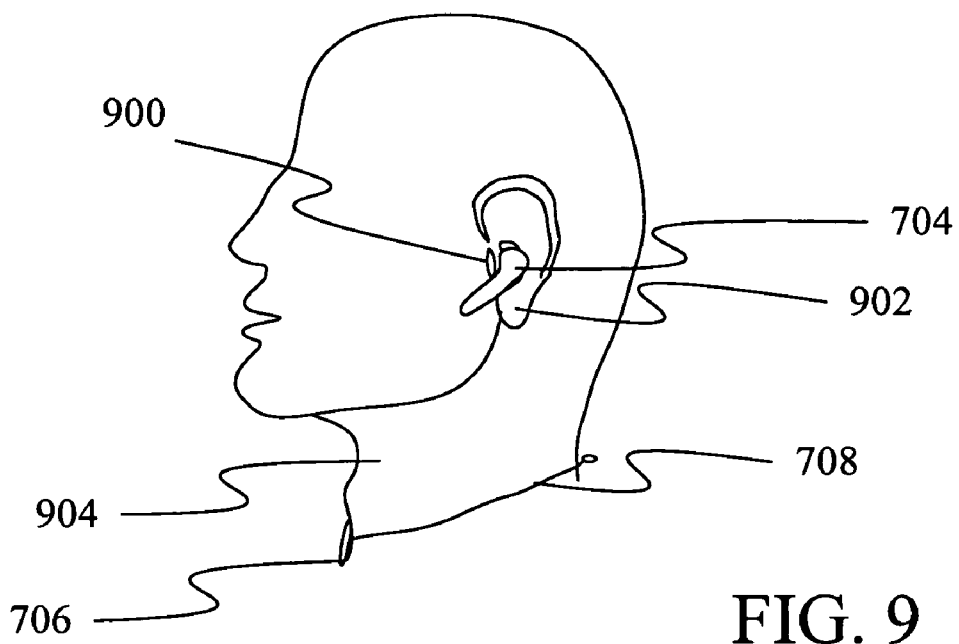
FIG. 9 shows the necklace embodiment of FIG. 7 positioned on a user.

As shown in FIG. 9, neck engaging piece 708 goes around a user's neck 900 to place pendant 706 in contact with the front of the user's neck slightly below the thyroid cartilage of the larynx, commonly referred to as the "Adam's Apple." Ear bud 704 is placed in the user's ear such that exterior portion 730 extends between the tragus 900 and the antitragus 902 of the outer ear.

Figure 10:
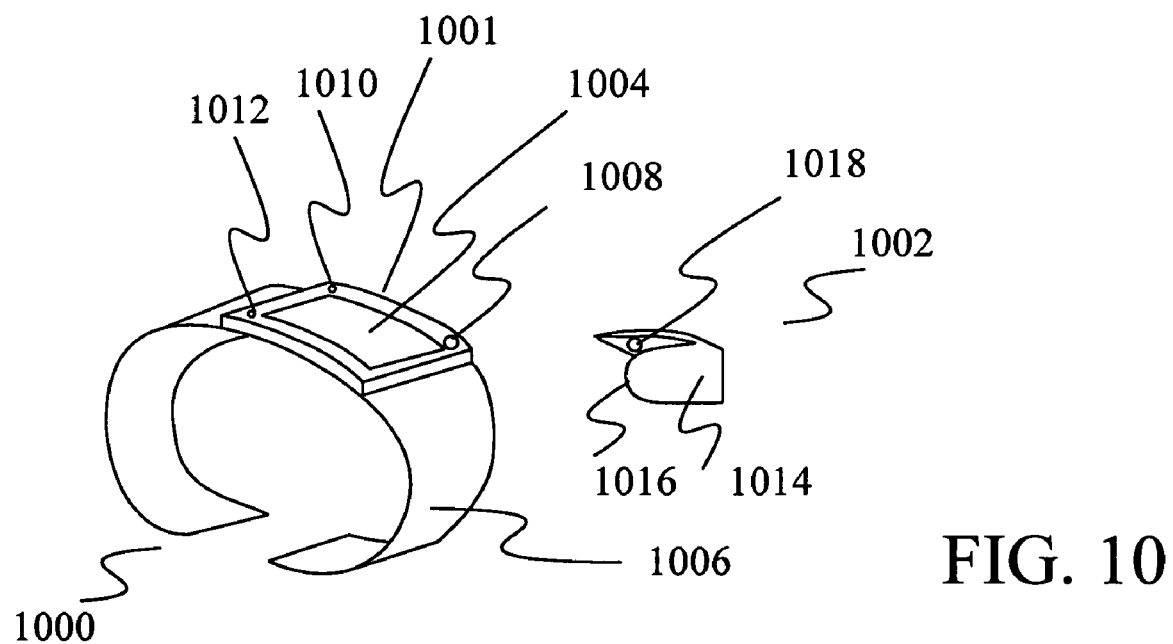
FIG. 10 provides a perspective view of a bracelet/watch embodiment of a mobile device of the present invention.

FIG. 10 provides a pictorial diagram of another embodiment of a mobile device under the present invention. In FIG. 10, the mobile device includes a watch or bracelet 1000 and an ear bud 1002. Watch 1000 includes an enclosure 1001, which is mounted on a wrist engaging piece 1006, such as a band, designed to be secured around the user's wrist. Enclosure 1001 has an interior that holds a set of electronic device, which includes a battery, a processor, memory, a communication interface, an input/output interface, a Global Positioning Satellite receiver, a video camera, speaker, air conduction microphone, pulse sensor, oximetry sensor and temperature sensor. These devices are described in more detail in FIG. 11. The communication interface allows the processor to communicate with a processor in ear bud 1002 and thereby transmit acoustic information to ear bud 1002 and receive data from an alternative sensor 1018 in ear bud 1002. In addition, the communication interface allows for wireless communication with one or more of a router, a personal computer, and other mobile devices. Enclosure 1001 includes openings corresponding to some of the electronic devices in the enclosure including pulse and oximetry meter 1008, air conduction microphone 1010, and video camera 1012. Pulse and oximetry meter 1008 measures the user's pulse when the user places their finger over the meter and also measures the oxygen content of the user's blood using a light source and a light sensor. The exterior of one side of enclosure 1001 also includes a display 1004.

Ear bud 1002 includes an ear portion 1014 designed to be placed in a user's ear canal and a speaker opening 1016. In addition, ear bud 1002 includes an alternative sensor 1018, which rests against the user's jaw when the ear bud 1002 is in the user's ear canal.

Figure 11:
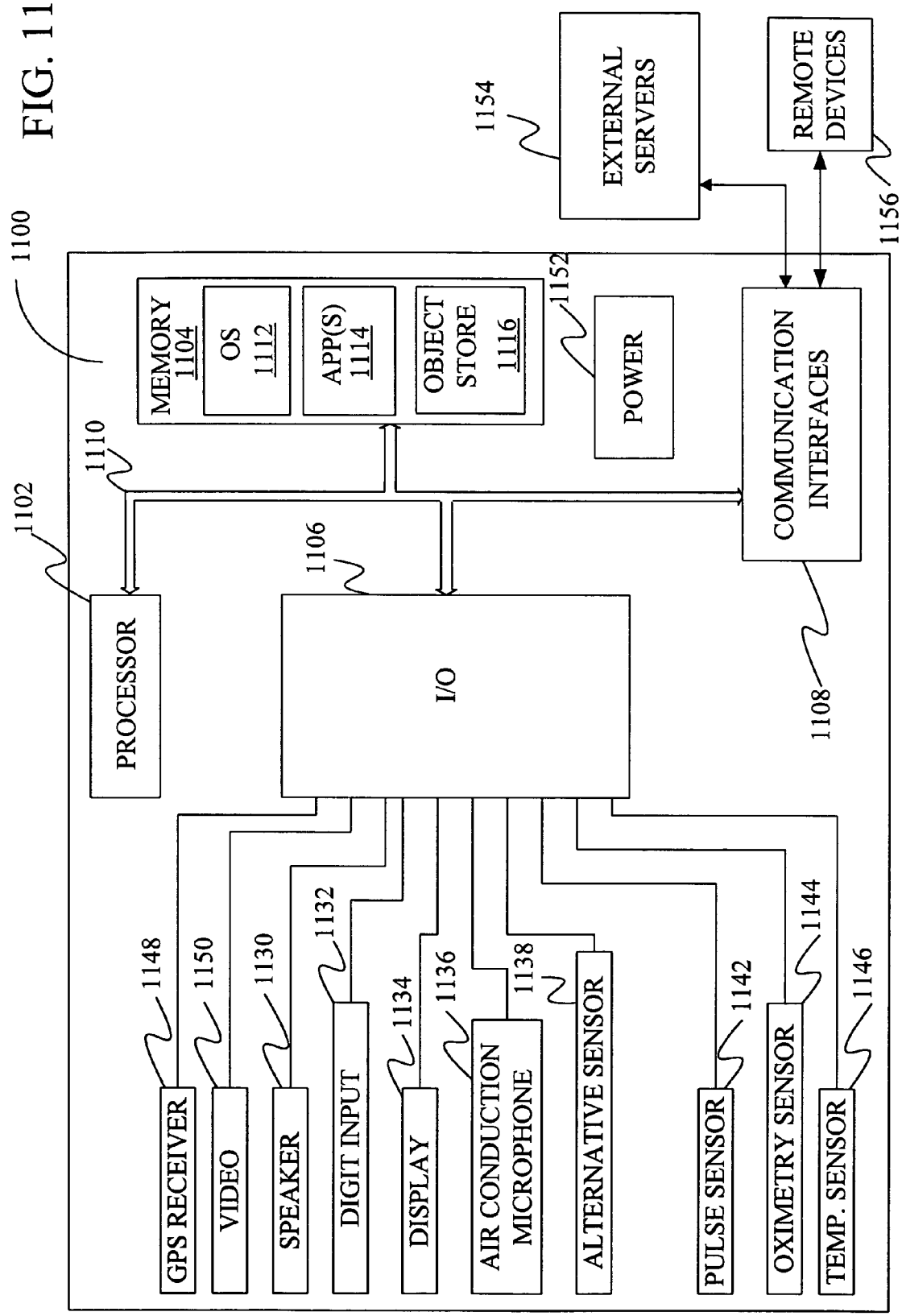
FIG. 11 is block diagram of a mobile device under one embodiment of the present invention.

FIG. 11 is a block diagram of a mobile device 1100, under several embodiments of the present invention. Mobile device 1100 includes a power supply 1152, microprocessor 1102, memory 1104, input/output (I/O) interface 1106, and a communication interface 1108 for communicating with remote computers, communication networks, or other mobile devices. In one embodiment, the afore-mentioned components are coupled for communication with one another over a suitable bus 1110. In addition, all of the components that require power are connected to power supply 1152, which is typically a battery. In FIG. 11, the connections between power supply 1152 and the remaining components are not shown to avoid unnecessarily complicating the figure.

Memory 1104 may be implemented as non-volatile electronic memory such as random access memory (RAM) with a battery back-up module (not shown) such that information stored in memory 1104 is not lost when the general power to mobile device 1100 is shut down. Alternatively, all or portions of memory 1104 may be volatile or non-volatile removable memory. A portion of memory 1104 is preferably allocated as addressable memory for program execution, while another portion of memory 1104 is preferably used for storage, such as to simulate storage on a disk drive.

Memory 1104 includes an operating system 1112, application programs 1114 as well as an object store 1116. During operation, operating system 1112 is preferably executed by processor 1102 from memory 1104. Operating system 1112, in one preferred embodiment, is a WINDOWS® CE brand operating system commercially available from Microsoft Corporation. Operating system 1112 is preferably designed for mobile devices, and implements database features that can be utilized by applications 1114 through a set of exposed application programming interfaces and methods. The objects in object store 1116 are maintained by applications 1114 and operating system 1112, at least partially in response to calls to the exposed application programming interfaces and methods.

Communication interface 1108 represents numerous devices and technologies that allow mobile device 1100 to send and receive information. In some embodiments, communication interface 1108 includes a cellular phone network interface that interacts with a cellular phone network to allow calls to be placed and received. Other interfaces include a PBx telephone interface, a wireless protocol interface such as 802.11 and its variants, satellite receivers and broadcast tuners to name a few. Mobile device 1100 can also be directly connected to a computer to exchange data therewith. In such cases, communication interface 1108 can be an infrared transceiver or a serial or parallel communication connection, all of which are capable of transmitting streaming information.

Communication interface 1108 allows mobile device 1100 to communicate with external servers 1154 and remote device 1156, including direct communication to other mobile devices.

The computer-executable instructions that are executed by processor 1102 to implement the present invention may be stored in memory 1104 or received across communication interface 1108. These instructions are found in a computer readable medium, which, without limitation, can include computer storage media and communication media.

Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Input/output interface 1106 represents interfaces to a collection of input and output devices including Global Positioning Satellite (GPS) receiver 1148, video camera 1150, speaker 1130, digit input 1132 (such as one or a set of buttons, a touch screen, a trackball, a mouse pad, a roller, or a combination of these components that can be manipulated by a user's thumb or finger), display 1134, air conduction microphone 1136, alternative sensor 1138, pulse sensor 1142, oximetry sensor 1144 and temperature sensor 1146.

Under one embodiment, alternative sensors 1138 is a bone conduction or throat conduction microphone. The devices listed above are by way of example and need not all be present on mobile device 1100. In addition, other input/output devices may be attached to or found with mobile device 1100 within the scope of the present invention.

Figure 12:
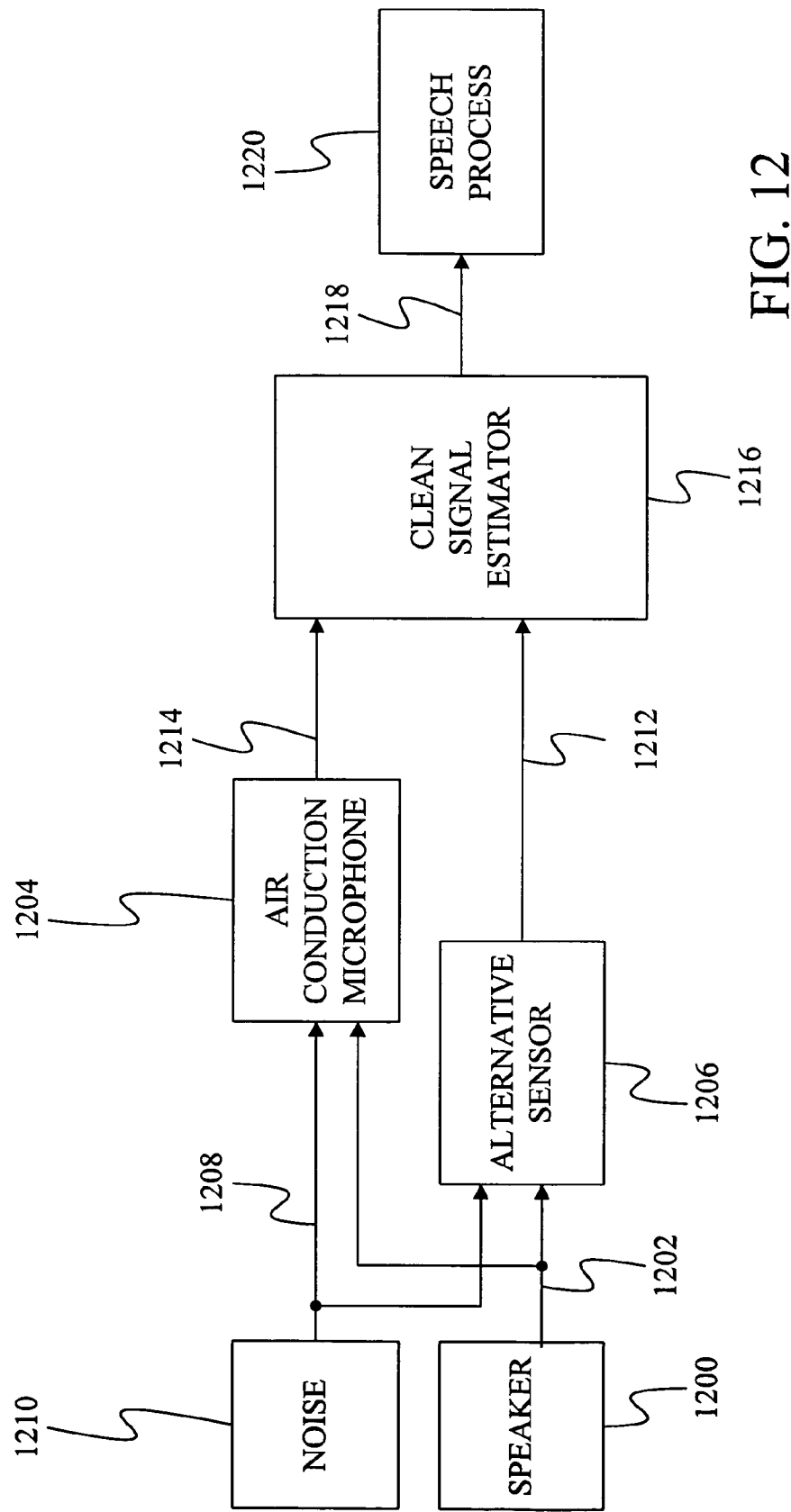
FIG. 12 is a block diagram of a general speech processing system of the present invention.

By using an air conduction microphone and an alternative sensor, embodiments of the present invention are able to provide an enhanced speech signal. FIG. 12 provides a basic block diagram of a speech processing system of embodiments of the present invention that provides the enhanced speech signal.

In FIG. 12, a speaker 1200 generates a speech signal 1202 that is detected by an air conduction microphone 1204 and an alternative sensor 1206. One example of an alternative sensor is a bone conduction sensor that is located on or adjacent a facial or skull bone of the user (such as the jaw bone) or on the ear of the user and that senses vibrations of the ear, skull or jaw that correspond to speech generated by the user. Another example of an alternative sensor is an infrared sensor that is pointed at and detects the motion of the user's mouth. A further example of an alternative sensor is a throat sensor that senses vibrations in the user's throat that correspond to speech generated by the user. Air conduction microphone 1204 is the type of microphone that is used commonly to convert audio air-waves into electrical signals.

Air conduction microphone 1204 also receives noise 1208 generated by one or more noise sources 1210. Depending on the type of alternative sensor and the level of the noise, noise 1208 may also be detected by alternative sensor 1206. However, under most embodiments of the present invention, alternative sensor 1206 is typically less sensitive to ambient noise than air conduction microphone 1204. Thus, the alternative sensor signal 1212 generated by alternative sensor 1206 generally includes less noise than air conduction microphone signal 1214 generated by air conduction microphone 1204.

Alternative sensor signal 1212 and air conduction microphone signal 1214 are provided to a clean signal estimator 1216, which estimates a clean speech signal 1218 from alternative sensor signal 1212 and air conduction microphone signal 1214. Clean signal estimate 1218 is provided to a speech process 1220. Clean speech signal 1218 may either be a filtered time-domain signal or a feature domain vector. If clean signal estimate 1218 is a time-domain signal, speech process 1220 may take the form of a listener, a cellular phone transmitter, a speech coding system, or a speech recognition system. If clean speech signal 1218 is a feature domain vector, speech process 1220 will typically be a speech recognition system.

The present invention utilizes several methods and systems for estimating clean speech using air conduction microphone signal 1214 and alternative sensor signal 1212. One system uses stereo training data to train correction vectors for the alternative sensor signal. When these correction vectors are later added to a test alternative sensor vector, they provide an estimate of a clean signal vector. One further extension of this system is to first track time-varying distortions and then to incorporate this information into the computation of the correction vectors and into the estimation of the clean speech.

A second system provides an interpolation between the clean signal estimate generated by the correction vectors and an estimate formed by subtracting an estimate of the current noise in the air conduction test signal from the air conduction signal. A third system uses the alternative sensor signal to estimate the pitch of the speech signal and then uses the estimated pitch to identify an estimate for the clean speech signal. A fourth system uses direct filtering, in which the alternative sensor signal and the air conduction signal are used to determine one or more channel responses of the alternative sensor. The channel response(s) are then used to estimate the clean speech signal.

Figure 13:
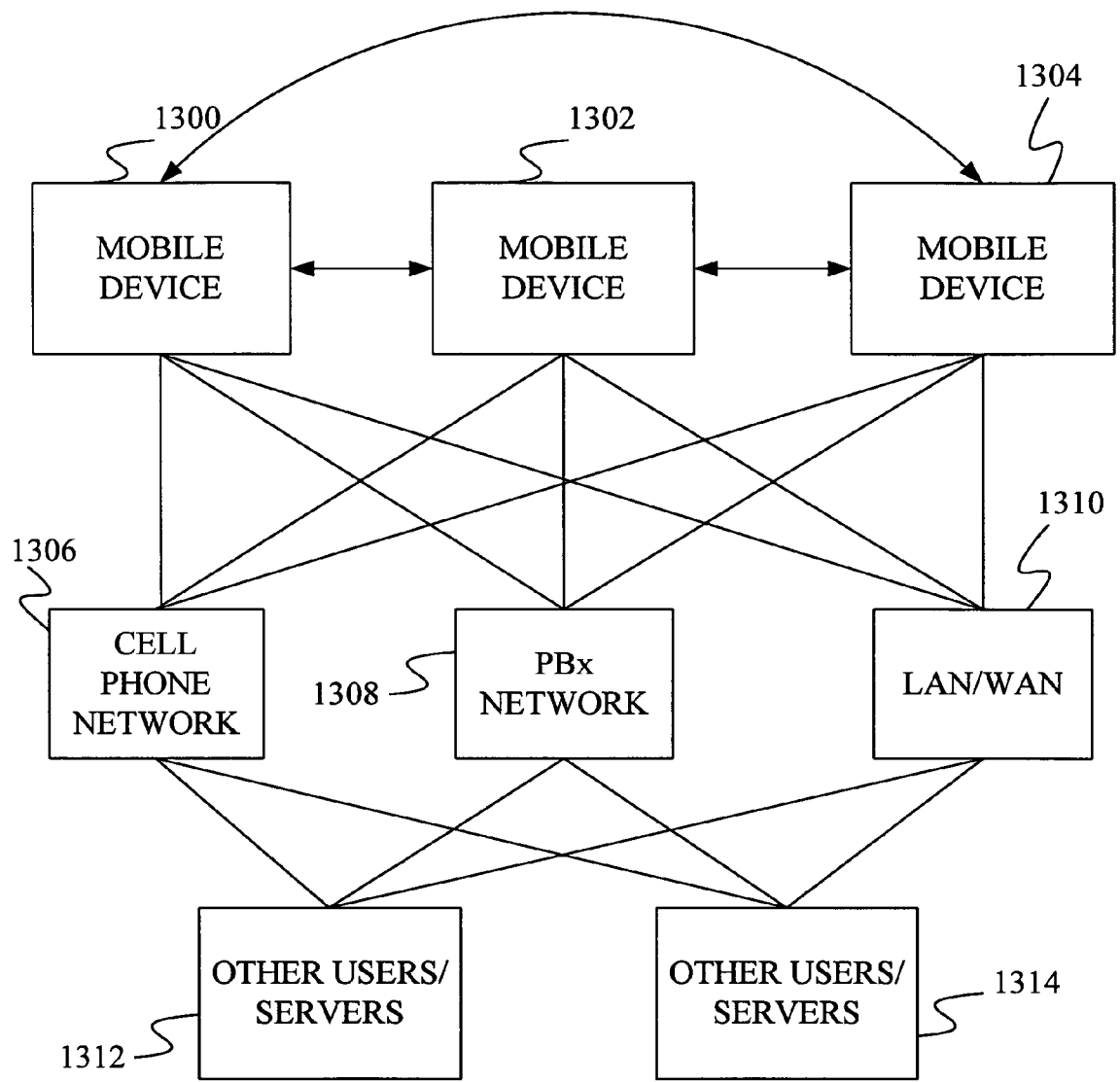
FIG. 13 is a block diagram showing possible communication connection of mobile devices of the present invention.

Using communication interfaces 1108, the mobile device of the present invention is able to communicate with a large number of other devices through a large number of different networks as shown in the block diagram of FIG. 13. In FIG. 13, three mobile devices 1300, 1302, and 1304 are shown. These mobile devices are able to communicate with each other through communication interface 1108. Under one particular embodiment, an 802.11 communication protocol is used to communicate between the mobile devices. The mobile devices may communicate with each other on a one-to-one basis, such as having just mobile device 1300 and 1302 communicate without communicating with mobile device 1304. The mobile devices may also communicate in a one-to-many configuration in which one of the mobile devices communicates to all of the other mobile devices, but the other mobile device do not communicate with each other. For example, mobile device 1300 would communicate with mobile devices 1302 and 1304, but mobile device 1302 would not communicate with mobile device 1304. The mobile devices may also communicate on a many-to-many basis in which all of the mobile devices can communicate with each other.

Each mobile device may also communicate with one or more of a plurality of networks, such as cell phone network 1306, PBx phone network 1308, and local area network/wide area network (LAN/WAN) 1310. To communicate with cell phone network 1306, the mobile devices may use a direct link to a cell phone tower through communication interface 1108, or may communicate with a cellular telephone using a local protocol such as 802.11. The cell phone would then relay the mobile device communications to the cell phone tower of the cell phone network 1306.

Mobile devices 1300, 1302, and 1304 can communicate with PBx phone network 1308 through a PBx hub that converts a wireless signal into a wire line signal for the PBx phone network. Any suitable protocols for such a hub may be used under the present invention. The mobile devices can communicate with LAN/WAN 1310 through a wireless connection to a laptop computer, a personal computer, or a wireless router that is part of the LAN/WAN.

Through networks 1306, 1308, and 1310, the mobile devices may communicate with other devices such as devices 1312 and 1314. These other devices may comprise lap top computers, personal computers, or servers that provide services to the mobile device. Such servers include, under some embodiments, a speech recognition server that identifies text from a speech signal and/or a translation server that translates text in one language into text or audio in another language. The servers may also include a live communication server that allows for instant messaging, keeps track of presence information such as whether the user is available for meetings, and coordinates communications to allow for real time collaboration on documents during live meetings that include both audio and video communications. The servers may also include a location-based server that provides location information about the mobile device such as maps indicating the location of the mobile device relative to other points of interest.

Because the mobile device of the present invention uses both an air conduction microphone and an alternative sensor to sense speech signals, it provides an enhanced speech signal that enables improved performance in a number of applications. Further, the combination of these microphones and alternative sensors with other devices, such as a GPS receiver, a video camera, and health sensor such as a pulse sensor, oximetry sensor and temperature sensor, allow the mobile device of the present invention to be used with multiple servers to provide integrated solutions to ease communication between multiple parties.

Figure 14:
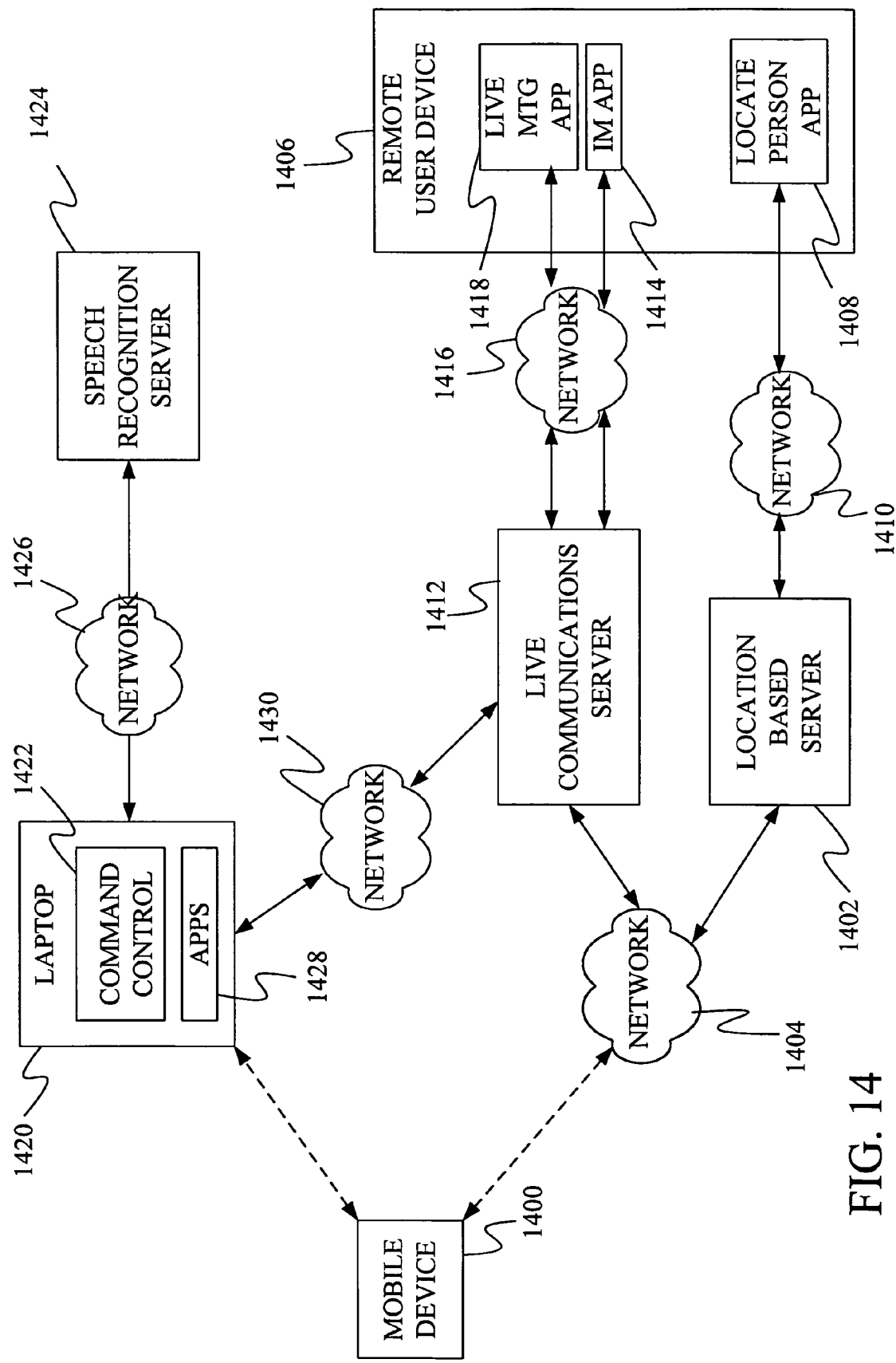
FIG. 14 is a block diagram showing a plurality of communication connections with a mobile device of the present invention to facilitate a meeting.

FIG. 14 provides a block diagram of connections between servers and a mobile device that provide the ability to locate a person carrying a mobile device, send an instant message to the mobile device to request a meeting, and utilize a live communication server to hold the meeting.

In FIG. 14, mobile device 1300 is equipped with a GPS receiver. Using the information from the GPS receiver, mobile device 1400 periodically communicates its location to a location-based server 1402 through a network connection 1404 such as a cell phone network or a LAN/WAN. This allows a remote user to use a locate person application 1408 on the remote user's computing device 1406 to obtain location information about mobile device 1400 from location-based server 1402 through a network connection 1410. This location information can include an address or a graphical representation of the location of the mobile device such as showing the location on a map.

Through network connection 1404, which may be the same network connection used to connect to location-based server 1402 or a different network connection, mobile device 1400 is also able to communicate with a live communication server 1412. Through this connection, a user holding mobile device 1400 is able to indicate whether they are available and on-line, and whether they are in the office or out of the office. In general, this is known as "presence" information.

In addition, mobile device 1400 is able to send and receive instant messages through live communication server 1412. These messages pass to and from remote user device 1406, which uses an instant message application 1414 to send and receive the messages. This would, for example, allow a remote user to request that the user of mobile device 1400 join a live meeting.

The remote user may establish a live meeting using a live meeting application 1418, which uses the services provided by live communication server 1412 to allow multiple clients to communicate with audio and video signals and to manipulate shared documents such that changes to the document made on mobile device 1400 appear in real time on the display of the remote user's computing device 1406.

Using a wireless connection, mobile device 1400 is able to communicate with a laptop computer 1420. Using the enhanced speech signal provided by having both an air conduction microphone signal and an alternative sensor signal, mobile device 1400 is able to send speech signals representing commands to laptop 1420. A command/control application 1422 in laptop 1420 forwards the speech signals to a speech recognition server 1424 through a network connection 1426. Speech recognition server 1424 converts the speech signal into text and returns the text to command/control application 1422. Based on the recognized command, command/control application 1422 initiates one or more applications 1428 and controls their operation.

One of the applications initiated through command/control unit 1422 can include a live meeting application that allows the user of the mobile device to join the live meeting generated by the remote user 1406. Laptop 1420 can communicate with live communication server 1412 through a network connection 1430. The user may interact with the live meeting directly on laptop 1420 or by issuing speech commands through mobile device 1400 to laptop 1420. In addition, laptop 1420 can relay speech signals produced by mobile device 1400 through live communication server 1412 to remote user device 1406 thereby providing the audio portion of the live meeting. Using the live meeting application, the user of the mobile device is able to share audio, video and documents with the remote user. This includes the ability for both the user of the mobile device and the remote user to manipulate the same document in real time.

Thus, using the block diagram of FIG. 14, a remote user is able to determine that the person wearing mobile device 1400 has not boarded a plane yet but is still in an airport. The remote user can then send an instant message to the wearer of the mobile device 1400 asking the wearer of the mobile device to join a live meeting. When the wearer of the mobile device is able to join the meeting, they can turn on their laptop 1420, issue commands through mobile device 1400 and join the live meeting established by remote user 1406. During the meeting, the user may speak through mobile device 1400 to provide audio input for the live meeting. Because the speech is enhanced in mobile device 1400, the commands provided to laptop 1420 operate more efficiently and reliably, and the speech provided by mobile device 1400 is more intelligible during the live meeting.

Figure 15:
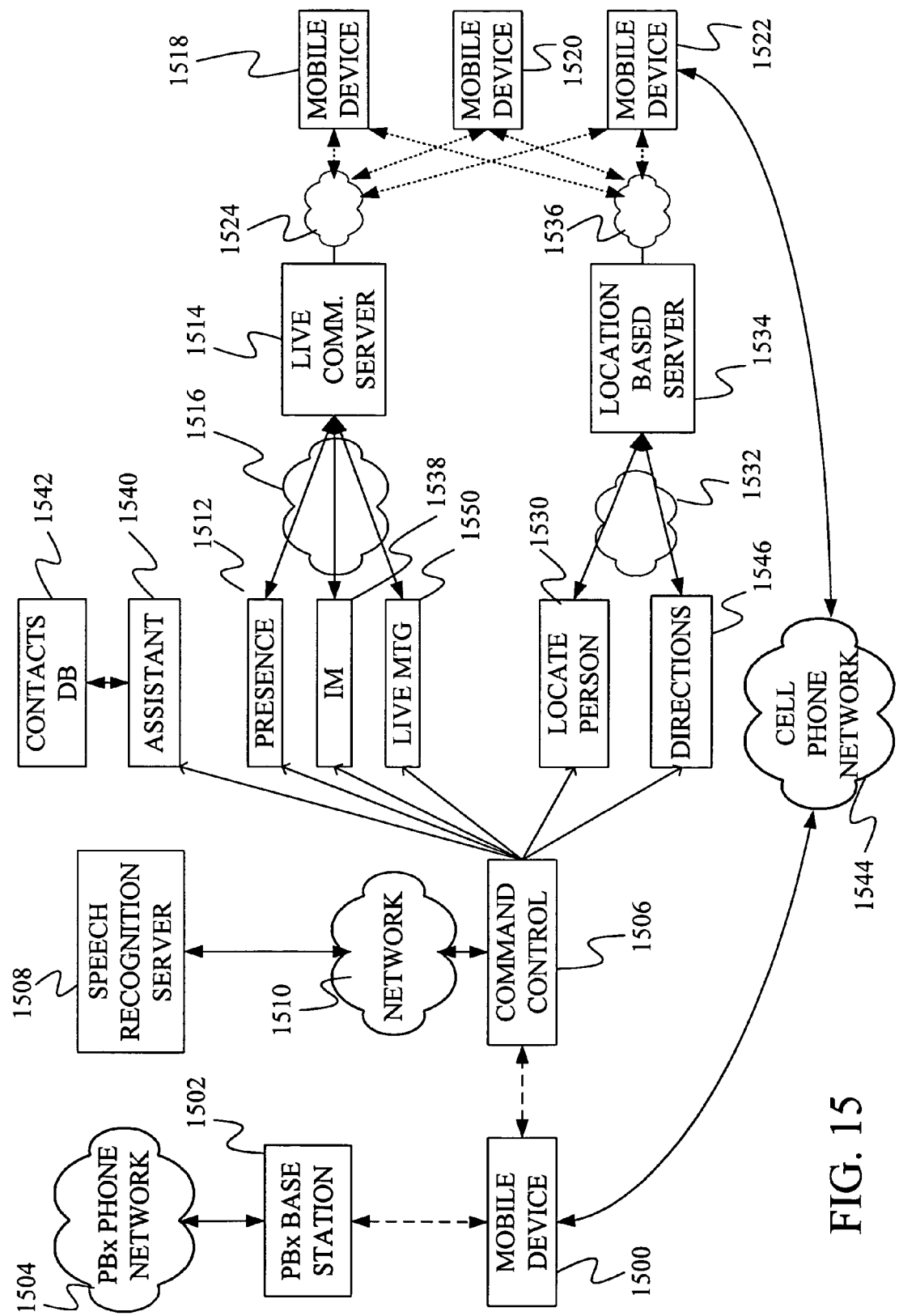
FIG. 15 is a block diagram showing a plurality of communication connections with a mobile device of the present invention to facilitate dispatching work orders.

FIG. 15 provides an alternative embodiment in which the mobile device of the present invention is used by a dispatcher to assign jobs to one or more workers, and to interact with the workers to provide them information necessary to perform the jobs. In particular, a dispatcher wears a mobile device 1500 in FIG. 15. The dispatcher receives phone calls from customers over a PBx phone network 1504, which communicates with mobile device 1500 through a PBx base station 1502. In particular, PBx base station 1502 provides a wireless connection to mobile device 1500 and converts communications along the wireless connection into an analog signal that can be carried on PBx phone network 1504.

After receiving the job request, the dispatcher determines which of a plurality of field workers is available and is closest to the job site. To determine which workers are available, the dispatcher speaks into mobile device 1500 to generate speech commands that are provided to a command/control unit 1506. Command control unit 1506 may be present within mobile device 1500 or may be in a separate device such as a laptop or a personal computer. Command/control until 1506 converts the speech signal into one or more commands. Under one embodiment, command/control unit 1506 performs this conversion by passing the speech signal to a speech recognition server 1508 through a network 1510. Speech recognition server 1508 converts the speech signal into text representing the command and returns to the text to command/control unit 1506.

To determine whether a worker is available, the command provided to command control unit 1506 would be a commanded to check the "presence" status of each worker using a presence application 1512. The presence application communicates with a live communication server 1514 through a network connection 1516. The live communication server stores and updates the presence status of each worker. Specifically, each worker has a mobile device, such as mobile devices 1518, 1520, and 1522, which are connected to the live communication server 1514 through a network connection 1524. Note that although a single network connection 1524 is shown in FIG. 15, each mobile device may be connected through different network connections and even different types of network connections. Through network connection 1524, mobile devices 1518, 1520, and

1522 are able to update the presence status of each of the workers associated with the mobile devices.

For those workers that are available, the dispatcher uses mobile device 1500 to find the current location of each worker by issuing a speech command to command/control 1506 to open a locate person application 1530. Locate person application 1530 communicates through network connection 1532 to a location-based server 1534. Location-based server 1534 keeps track of the location of mobile devices 1518, 1520, and 1522 by receiving location information through a network 1536. Network 1536 can include a cell phone network, in which the location of the mobile device is determined by which tower in the cell phone network the mobile device is communicating through. In other embodiments, each mobile device 1518, 1520, and 1522 can include a GPS receiver and the position information determined by the GPS receivers can be communicated through network 1536 to location-based server 1534.

In response to the request by locate person application 1530, location-based server 1534 can provide location information for each of the mobile devices. This location information may be in the form of an address or in the form of a graphical representation in which the location of each of the mobile devices is shown on a map.

Based on the location of each of the workers, the dispatcher selects one of the workers to assign the job to. Under one embodiment, the dispatcher sends an instant message to that worker by issuing a speech command through command/control 1506 to initiate an instant message application 1538 and to create an instant message that is routed through network 1516, live communication server 1514, network 1524 to reach one of the mobile devices 1518, 1520, and 1522. In another embodiment, the dispatcher issues a command through mobile device 1500 and command/control 1506 to initiate an assistant application 1540, which accesses a contacts database 1542 to locate the phone number of the mobile device associated with the worker. Using this phone number, mobile device 1500 connects to the mobile device of the worker through a cell phone network 1544. Using this cellular phone connection, the dispatcher instructs the worker to proceed to the job site.

If the worker needs directions to the job site, the dispatcher issues a voice command through mobile device 1500 to instantiate a directions application 1546, which uses location-based server 1534 to provide directions to one of the workers through mobile device 1518, 1520, and 152. In particular, location-based server 1534 uses the location of the mobile device and the location of the job as provided through mobile device 1500 by the dispatcher, to generate a map and driving directions for reaching the location of the job site from the worker's current location.

Once the worker has arrived at the location, he can use his mobile device, such as mobile devices 1518, 1520, and 1522 to establish a live meeting with the dispatcher to receive specifications for the job. This can be achieved by having the dispatcher use mobile device 1500 to invoke a live meeting application, which communicates to live communication server 1514 to allow for real time collaboration and the sharing of documents such as order forms and plans for the projects.

Figure 16:
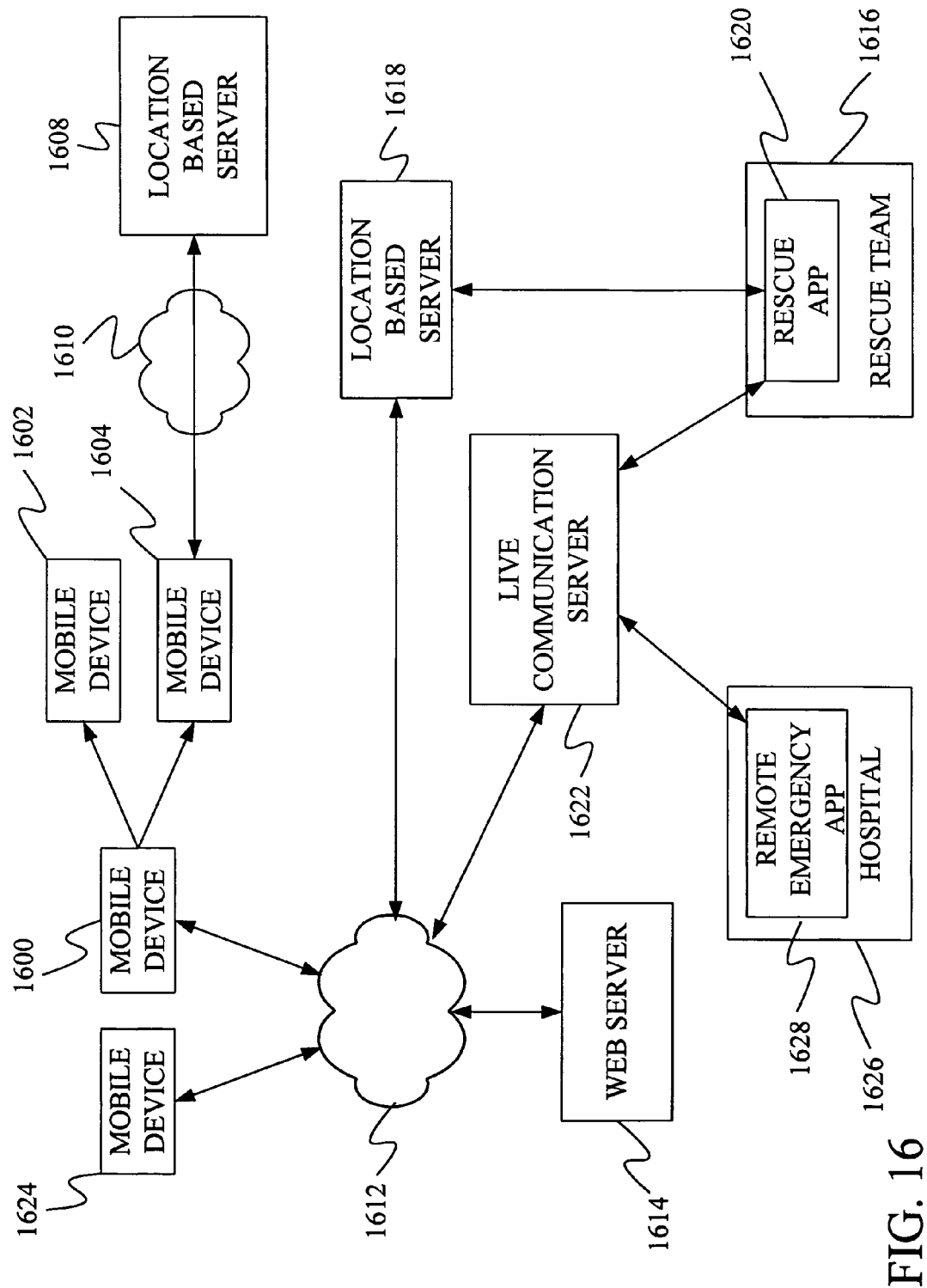
FIG. 16 is a block diagram showing a plurality of communication connections with a mobile device of the present invention to facilitate group communication and to aid in a rescue.

Under other embodiments of the present invention, the mobile device is capable of switching between various modes of communication. For example, in FIG. 16, a mobile device 1600 may initially broadcast information directly to other mobile devices 1602 and 1604 on a one-to-many basis. For example, mobile device 1600 could be providing information such as audio, video, GPS position information, and health information such as pulse, oximetry and temperature to mobile devices 1602 and 1604. During this communication mode, mobile device 1604 can use the position information from mobile device 1600 to obtain a graphical representation of the position of the wearer of mobile device 1600. In one specific embodiment, mobile device 1604 can provide the location information from mobile device 1600 to a location-based server 1608 through a wireless connection to network 1610. Location-based server 1608 would then use the position information to generate a map that is returned to mobile device 1604. In such an embodiment, the wireless connection to network 1610 can be made through a router, a personal computer, or a laptop computer.

Mobile device 1600 can switch from the peer-to-peer communication described above to communication with one or more servers through a network connection 1612. For example, if the wearer of mobile device 1600 encounters an injured party during a workout, the wearer can switch mobile device 1600 from the one-to-many communications with the mobile devices to a communication through network 1612. Using the network connection, the wearer of mobile device 1600 can access web pages stored on a web server 1614, which is connected to network 1612, to locate and communicate with a rescue team 1616.

Once rescue team 1616 has been contacted, it can initiate a rescue application 1620 to collect information from mobile device 1600 to help in the rescue of the injured party. This information can include GPS position information provided by mobile device 1600 to a location-based server 1618 through network 1612. Rescue application 1620 can send a request to location-based server 1618 to obtain a graphical representation of the position of mobile device 1600, thereby making it easier for rescue team 1616 to locate the wearer of the mobile device. Rescue application 1620 can also use a live communication server 1622 to share information with the wearer of mobile device 1600, such as the current position of the rescue team, and the expected time of arrival, as well as instructions for caring for the injured person. These instructions can include videos indicating the manner of treating the injured person as well as video captured by mobile device 1600 of the injured person.

If the injured person is also wearing a mobile device, such as mobile device 1624, that mobile device can be included in the meeting through live communication server 1622 so that the mobile device can provide health information about the injured party.

If the injuries appear to be serious, the rescue team can ask a health care team at a hospital 1626 to join the live meeting using a remote emergency application 1628. This remote emergency application can collect the health status information provided by mobile device 1624 and allow the health care team to provide audio and visual instructions to the rescue team 1616. Remote emergency application 1628, can also allow the health care team to begin scheduling needed resources within the hospital to care for the patient such as diagnostic equipment and operating rooms.

Figure 17:
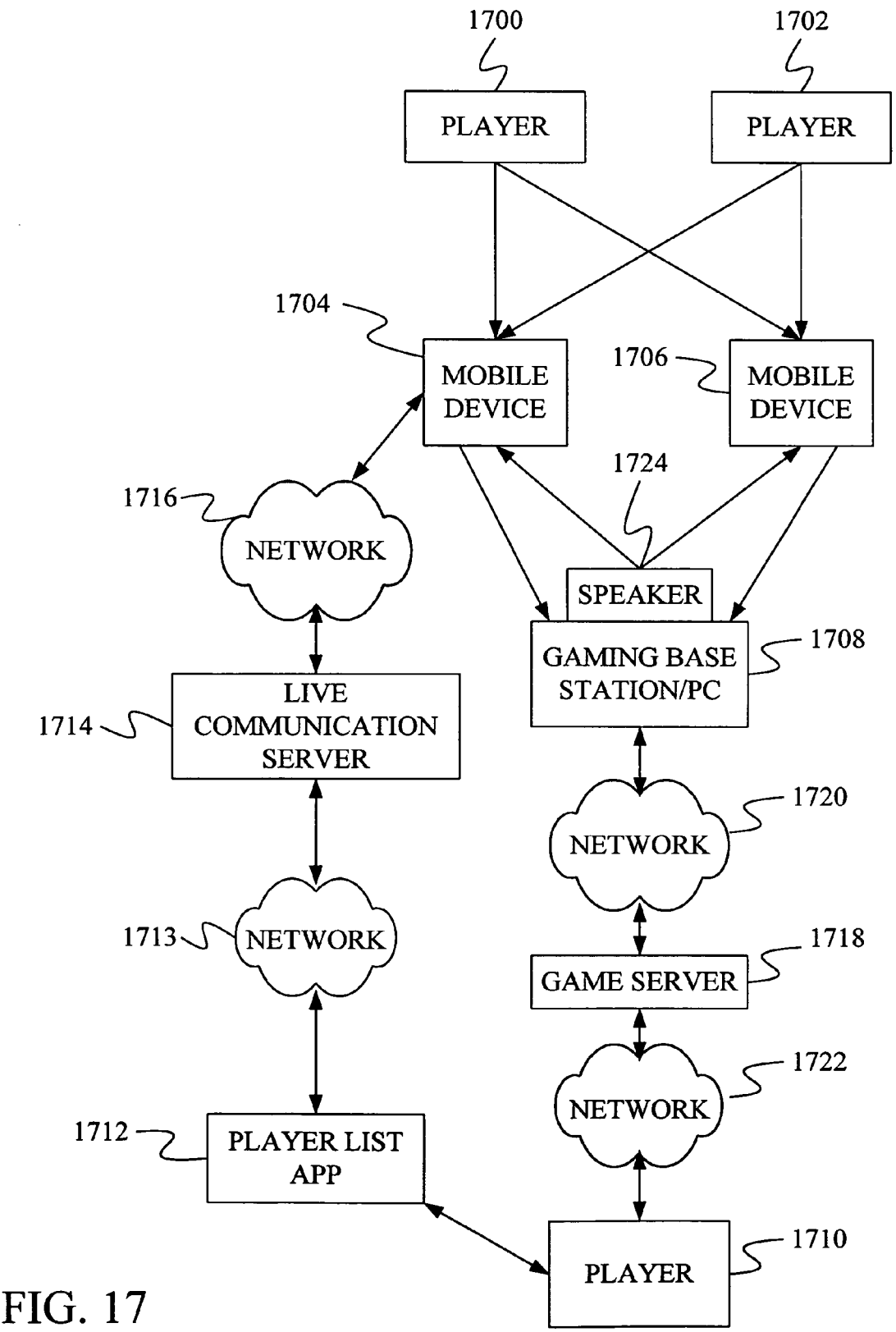
FIG. 17 is a block diagram showing a plurality of communication connections with a mobile device of the present invention to facilitate gaming.

The mobile device of the present invention can also be used in a gaming context to allow a user to communicate with team members and opponents in a game. As shown in FIG. 17, players, such as players 1700 and 1702 wearing respective mobile devices 1704 and 1706 interact with a gaming base station 1708.

Under one embodiment, a remote player 1710 determines that player 1700 is available by accessing a player list application 1712, which connects to a live communication server 1714 through a network connection 1713 to determine the presence, or availability, of player 1700 through a connection between mobile device 1704 and live communication server 1714 over a network 1716. If live communication server 1714 indicates that player 1700 is available, player 1710 may send an instant message through live communication server 1714 to mobile device 1704 to request that the player join in a game. Under one embodiment, this game is controlled by a game server 1718 which is connected to gaming base station 1708 through a network 1720 and to player 1710 through network 1722.

During gaming, audio and video from players 1700 and 1702 is captured by mobile devices 1704 and 1706, respectively, and provided to gaming base station/PC 1708 through a wireless connection. This audio and/or video is provided through network connection 1720 to game server 1718 and is forwarded to player 1710 by game server 1718.

Under one embodiment, to reduce the bandwidth of the audio information distributed through network 1720, mobile devices 1704 and 1706 filter out all sounds that do not occur while the player associated with the mobile device is speaking. In particular, by using the alternative sensor in the mobile device, the mobile device is able to determine when the player is actually speaking. When the player is not speaking, the mobile device does not transmit any audio data. As a result, speech signals from the other player who is present in the room or speech signals generated by the gaming station through a speaker 1724 are not output as audio data by mobile devices 1704 and 1706. This reduces the amount of information that is sent to gaming base station 1708 and thus reduces the amount of information that is passed through network 1720. By reducing the amount of information output by mobile devices 1704 and 1706, the present invention reduces the power consumption of mobile devices 1704 and 1706 by not requiring the mobile devices to filter and broadcast unwanted audio data. Another more direct way of saving power consumption is to turn off the processing (within the microphone) when the user is not speaking.

Figure 18:
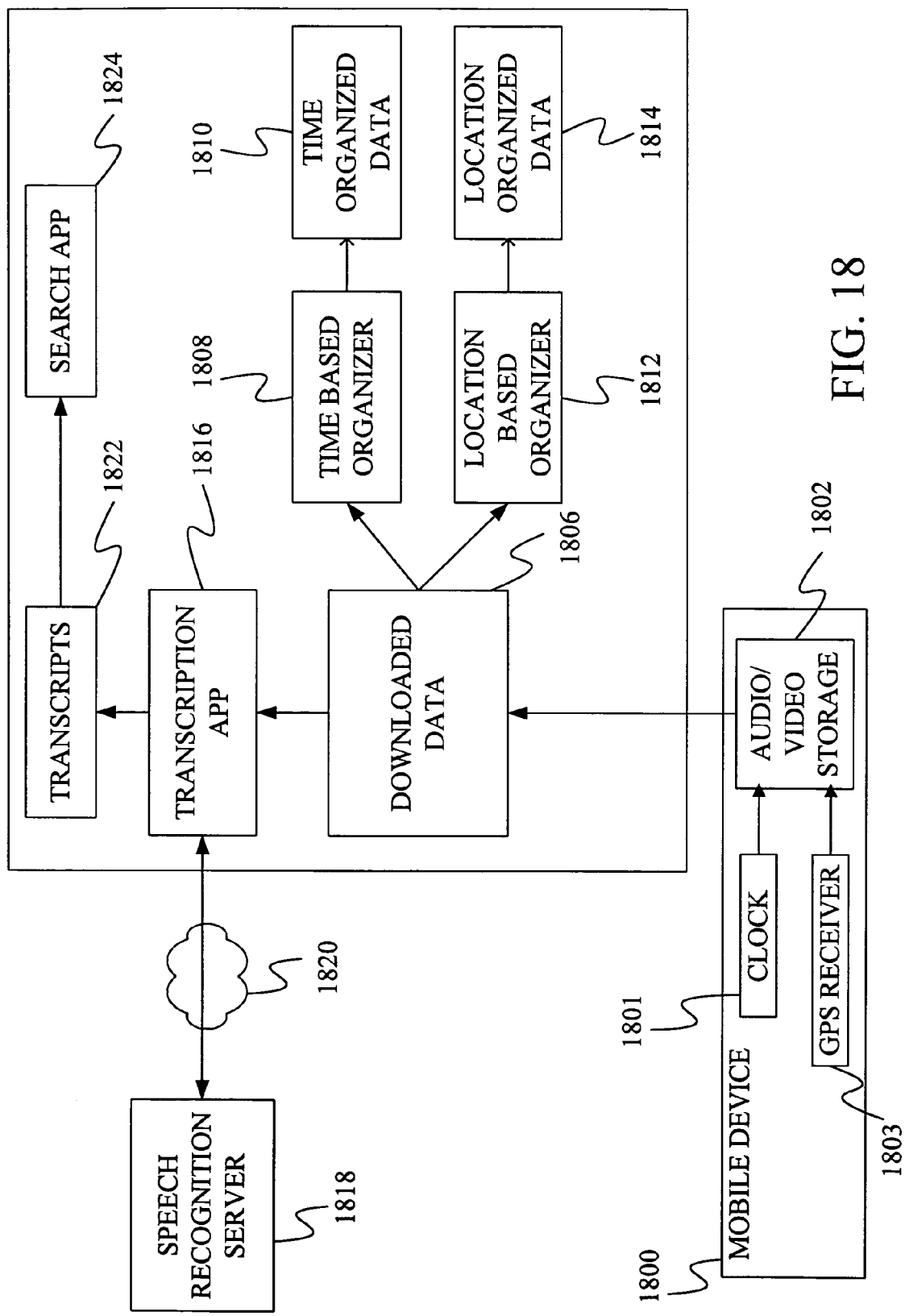
FIG. 18 is a block diagram showing the ability to store, organize and review video and audio using a mobile device of the present invention.

The mobile device of the present invention also allows for recording and storing better quality audio, especially speech signals, which can later be reviewed. FIG. 18 provides a block diagram of a system that allows for storage and review of audio and video data.

In FIG. 18, mobile device 1800 stores audio and video data locally in an audio/video memory storage 1802. Using a wireless connection to a personal computer 1804, the audio and video data stored in memory storage 1802 can be downloaded to PC 1804 to become downloaded data 1806. When the audio and video data is stored in audio/video storage 1802, mobile device 1800 includes a time stamp indicating the time and date when the audio and video was captured as well as a position stamp indicating the position of mobile device 1800 when the audio and video data was collected. Under one embodiment, the time stamp is generated from a clock 1801 and the position stamp is generated by a Global Positioning Satellite receiver 1803. The time stamps and position stamps are downloaded with the respective audio and video clips into downloaded data 1806.

Using the time stamps, a time-based organizer 1808 is able to organize the data based on the time to form time-organized data 1810. A location-based organizer 1812 organizes the audio and video data based on the position stamp associated with the data to form location-organized data 1814. The user can then use the display of personal computer 1804 to review the time-organized data 1810 or the location-organized data 1814.

The audio data in downloaded data 1806 may also be transcribed by a transcription application 1816. To transcribe the audio data, transcription application 1816 may use a speech recognition server 1818, which may be found locally on personal computer 1804 or may be connected to personal computer 1804 through a network connection 1820. Transcription application 1816 sends the audio data representing the audio signal to speech recognition server 1818, which converts the audio data into text. The text is then returned to transcription application 1816, which uses the text to produce a transcript 1822. Because mobile device 1800 uses an alternative sensor and an air conduction microphone to collect speech data, the recognition performed by speech recognition server 1818 is much improved, and the transcript 1822 better reflects the actual speech collected by mobile device 1800.

Once the transcripts 1822 have been formed, the user can invoke a search application 1824 that can search the transcripts 1822 for keywords to locate particular conversations.

Figure 19:
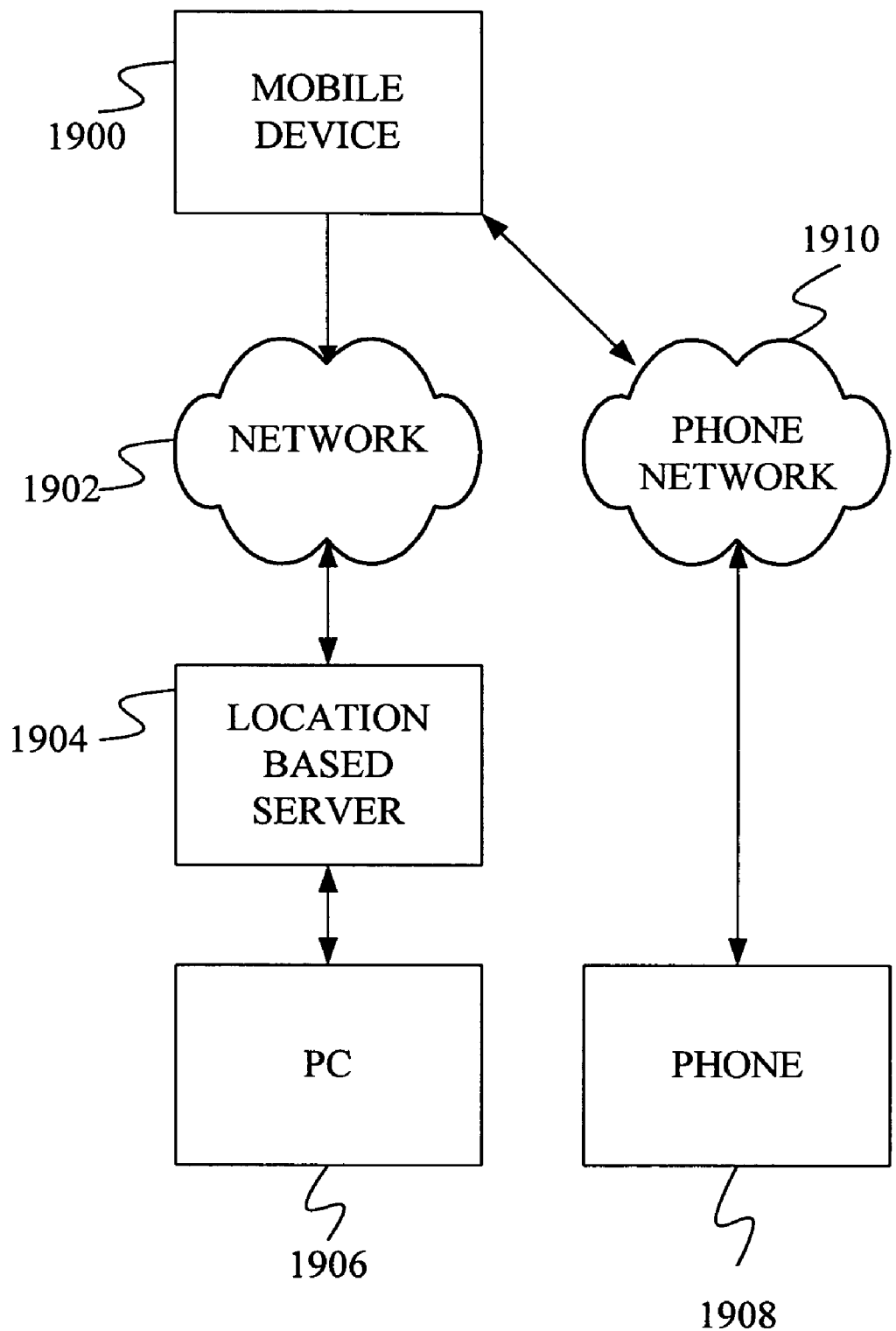
FIG. 19 is a block diagram showing a plurality of communication connections with a mobile device of the present invention to facilitate locating and communicating with children/elderly.

Mobile devices of the present invention may also be used to locate and communicate with children and elderly persons who are wearing a mobile device. For example, in FIG. 19, mobile device 1900 is worn by a child or an elderly person. The mobile device provides GPS position information through a network 1902 to a location-based server 1904. Using a personal computer 1906, another user may contact location-based server 1904 to obtain position information for the wearer of mobile device 1900. This position information can be provided in the form of an address or a graphical representation of a map indicating the location of the wearer within the map. The other user may also contact the wearer of the mobile device using a phone 1908 through a phone network 1910 that communicates to mobile device 1900. An example of such a phone network would be a cellular phone network. By using an alternative sensor and an air conduction microphone sensor, mobile device 1900 provides a better speech signal for communicating through phone network 1910. This is especially important when the wearer of mobile device 1900 is a child or an elderly person, since the speech signals for children and the elderly tend to have lower amplitudes, and thus are harder to discern in noisy environments.

Figure 20:
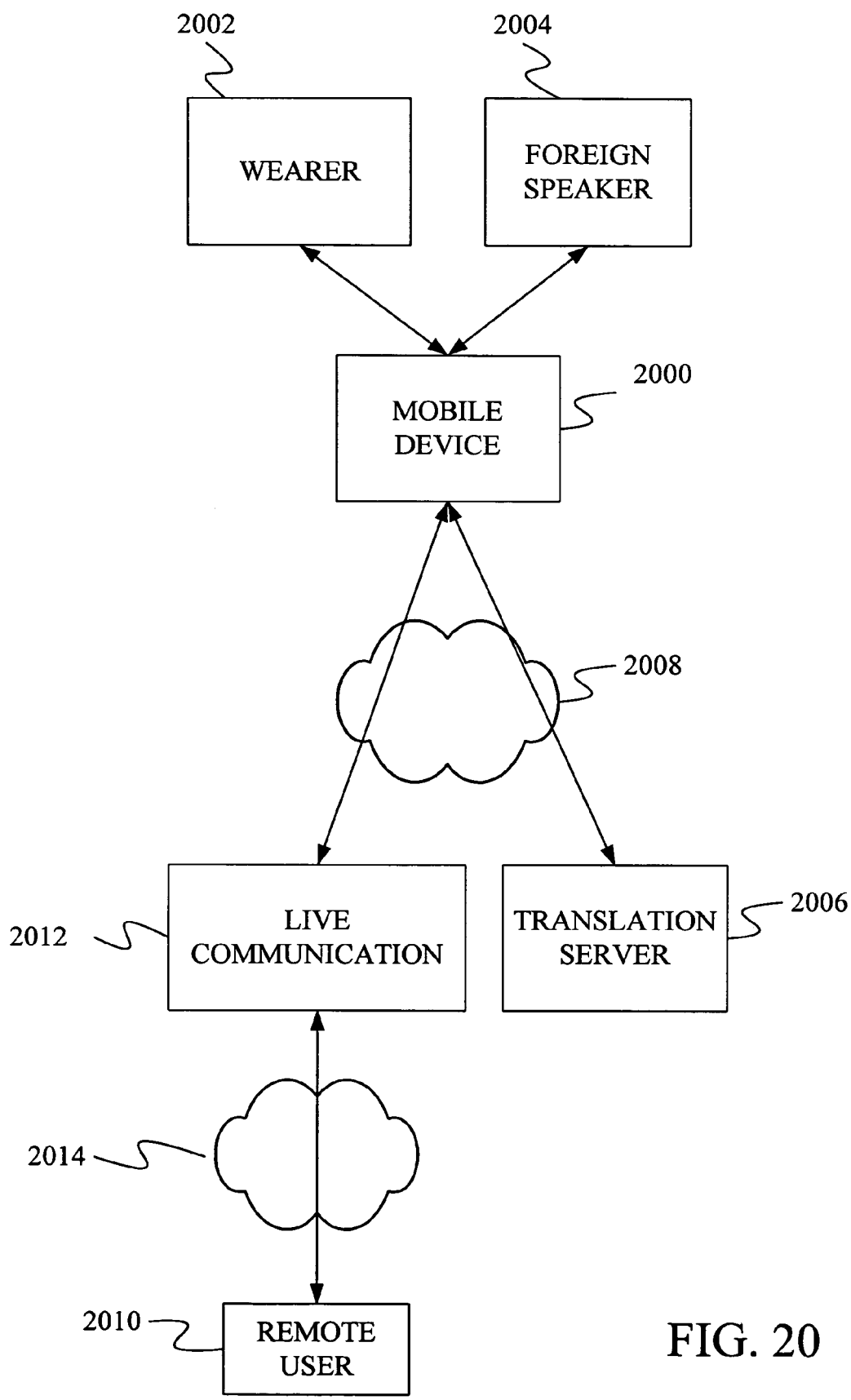
FIG. 20 is a block diagram showing a plurality of communication connections with a mobile device of the present invention to facilitate meetings that need translation of speech.

The mobile device of the present invention can also be used to improve automatic translation services. For example, in FIG. 20, a mobile device 2000 receives speech input from a wearer of the mobile device 2002 and a foreign speaker 2004. Because mobile device is worn by wearer 2002, mobile device 2000 can distinguish between speech produced by wearer 2002 and speech produced by foreign speaker 2004. The speech produced by foreign speaker 2004 can thus be automatically routed by mobile device 2000 to a translation server 2006 through a network connection 2008. Translation server 2006 can then return either translated audio or translated text of the speech produced by foreign speaker 2004. Using a display on mobile device 2000 or a speaker on mobile device 2000, wearer 2002 can thus understand the content of the speech of foreign speaker 2004. Because mobile device 2000 is able to automatically separate the two speech signals, the translation is more easily obtained.

Mobile device 2000 could also share the foreign speech, the translated speech or translated text, and a video of the foreign speaker captured by mobile device 2000 with a remote user 2010. Under one embodiment, this information is shared through a live communication server 2012, which is connected to remote user 2010 through a network connection 2014 and to mobile device 2000 through a network connection 2008. Using the connection through live communication server 2012, remote user 2010 is able to speak with foreign speaker 2004 and is able to provide video data to foreign speaker 2004 through a display on mobile device 2000. Speech provided by remote user 2010 may be routed by mobile device 2000 to translation server 2006 to be translated into the language of the foreign speaker. An audio signal based on this translation is then provided to the foreign speaker through a speaker in mobile device 2000.

Figure 21:
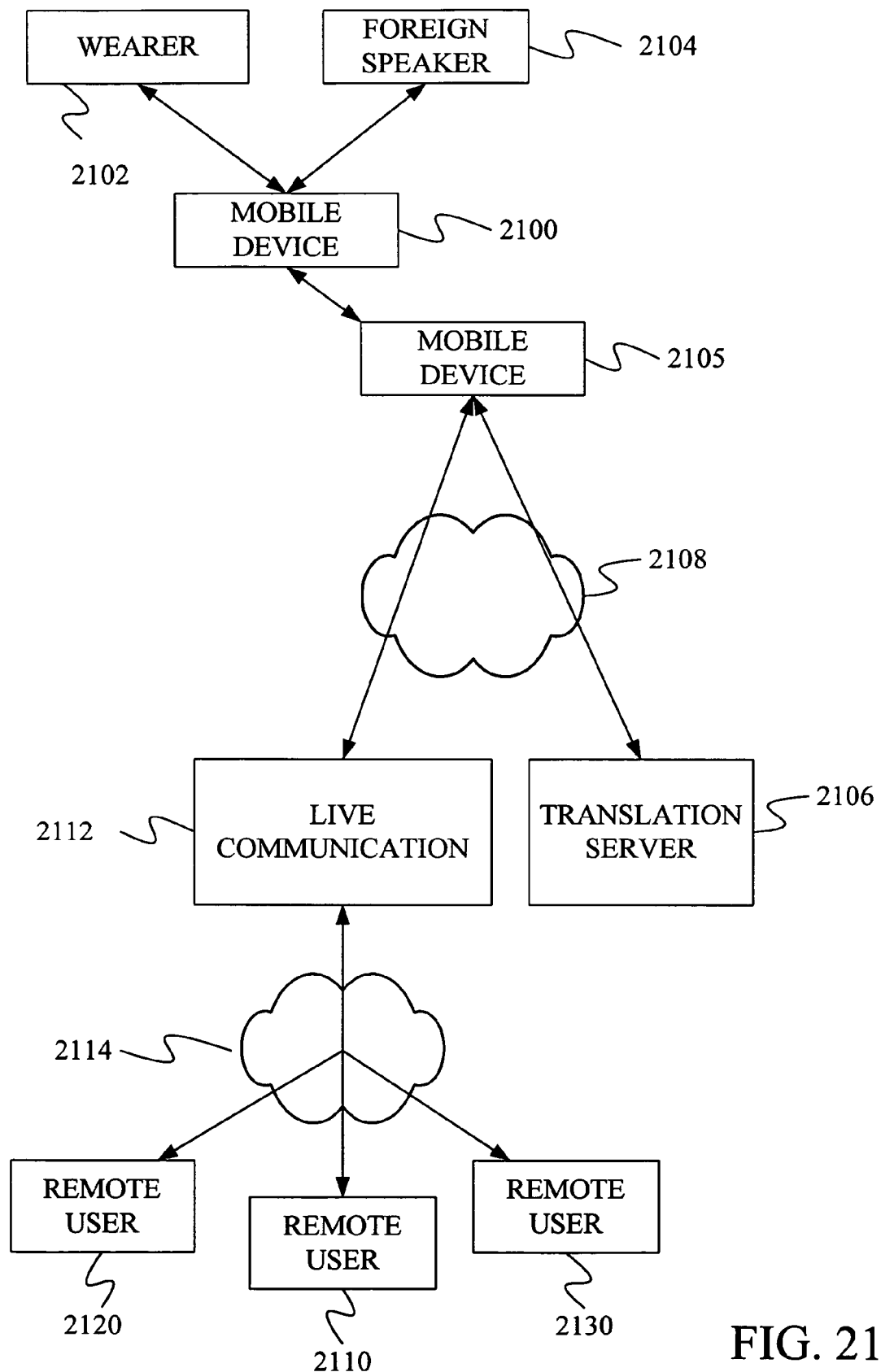
FIG. 21 is a block diagram showing a plurality of communication connections with a mobile device of the present invention to facilitate meetings that need translation of speech.

FIG. 21 provides an alternative embodiment of the present invention for improving automatic translation services. In FIG. 21, a mobile device 2100 receives speech input from a wearer of the mobile device 2102 and a foreign speaker 2104. Because mobile device is worn by wearer 2102, mobile device 2100 can distinguish between speech produced by wearer 2102 and speech produced by foreign speaker 2104. The speech produced by foreign speaker 2104 can thus be identified in communications between mobile device 2100 and another mobile device 2105. Mobile device 2105 can take the speech data that has been identified as coming from a foreign speaker by mobile device 2100 and provide it to a translation server 2106 through a network connection 2108. Translation server 2106 can then return either translated audio or translated text of the speech produced by foreign speaker 2104. Using a display on mobile device 2100 or a speaker on mobile device 2100, wearer 2102 can thus understand the content of the speech of foreign speaker 2104. Because mobile device 2100 is able to automatically separate the two speech signals, the translation is more easily obtained.

Mobile device 2105 could also share the foreign speech, the translated speech or translated text, and a video of the foreign speaker captured by mobile device 2100 with a plurality of remote users 2110, 2120, and 2130. Under one embodiment, this information is shared through a live communication server 2112, which is connected to remote users 2110, 2120, and 2130 through a network connection 2114 and to mobile device 2105 through a network connection 2108. Using the connection through live communication server 2112, remote users 2110, 2120, and 2130 are able to speak with foreign speaker 2104 and are able to provide video data to foreign speaker 2104 through a display on mobile device 2100. Speech provided by remote users 2110, 2120, and 2130 may be routed by mobile device 2105 to translation server 2106 to be translated into the language of the foreign speaker. An audio signal based on this translation is then provided to the foreign speaker through a speaker in mobile device 2100.

Figure 22:
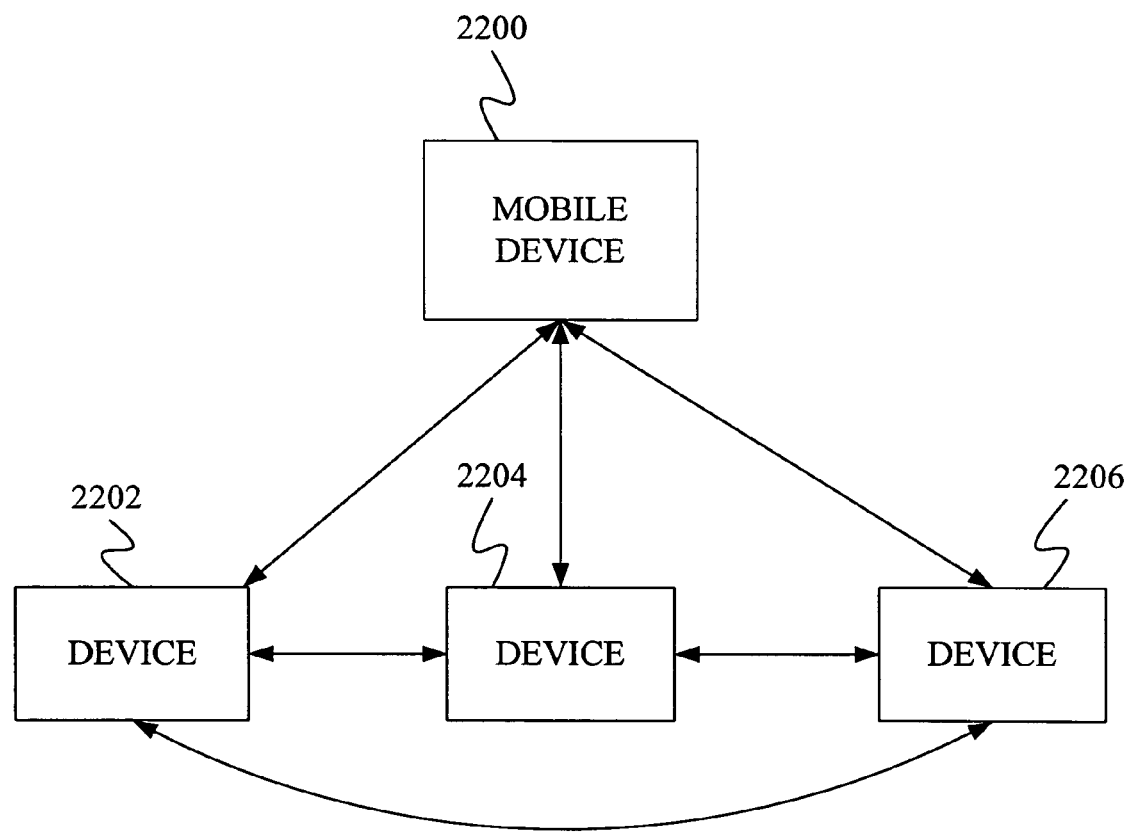
FIG. 22 is a block diagram showing a plurality of peer-to-peer communication connections between a mobile device of the present invention and other devices.

Mobile devices of the present invention may also communicate in a peer-to-peer mode with other devices such as printers, appliances, media recorders, media players, and automobiles. FIG. 22 provides a diagram showing a mobile device 2200 in communication with other devices such as devices 2202, 2204, and 2206.

Under one particular embodiment, an 802.11 communication protocol is used to communicate between the mobile device and the other devices. The mobile device may communicate with the other devices on a one-to-one basis, such as having mobile device 2200 communicate with device 2202 without communicating with devices 2204 and 2206. The mobile device may also communicate in a one-to-many configuration in which the mobile device or one of the other devices communicates to the mobile device and all of the other devices, but the other devices do not communicate with each other. For example, mobile device 2200 would communicate with devices 2202 and 2204, but device 2202 would not communicate with device 2204. The devices may also communicate on a many-to-many basis in which all of the devices and the mobile device can communicate with each other.

Although the present invention has been described with reference to particular embodiments, workers skilled in the art will recognize that changes may be made in form and detail without departing from the spirit and scope of the invention.

What is claimed is:

1. A mobile device comprising:
an air conduction microphone that converts acoustic waves representative of a portion of speech into an electric microphone signal;
an alternative sensor that detects information representative of the portion of speech separate from the electronic microphone signal and provides an electric alternative sensor signal comprising information representative of the portion of speech, wherein
the mobile device communicates directly with other mobile devices, the mobile device communicates with a server on a network, wherein
the communication with the server comprises audio, video, and data corresponding to an image of a document that is shared with another computing device, and wherein the mobile device transmits instructions to the server instructing the server to modify the document based on said instructions and to provide data corresponding to the modification of the document to the other computing device.

2. The mobile device of claim 1 wherein the communicating directly with other mobile devices comprises multiple types of communication with other mobile devices.

3. The mobile device of claim 2 wherein one of the multiple types of communication comprises one-to-one communication with one other mobile device even when more than one other mobile device is available for communication.

4. The mobile device of claim 2 wherein one of the multiple types of communication comprises one-to-many communication with a plurality of other mobile devices.

5. The mobile device of claim 2 wherein one of the multiple types of communication comprises many-to-many communication.

6. The mobile device of claim 1 wherein the mobile device further comprises a global positioning satellite receiver that is capable of generating a position value indicative of the position of the mobile device.

7. The mobile device of claim 6 wherein communication with a server comprises providing the position value to the server.

8. The mobile device of claim 1 wherein the server hosts a speech recognition program and wherein communicating with the server comprises providing audio data to the server and receiving recognized text from the server.

9. The mobile device of claim 1 wherein the server hosts a translation program and wherein communicating with the server comprises providing content in one language to the server and receiving a translation in another language from the server.

10. The mobile device of claim 1 wherein the mobile device comprises a cellular phone.

11. The mobile device of claim 1 wherein the mobile device comprises a personal digital assistant.

12. The mobile device, of claim 1 wherein the mobile device further communicates directly with another device.

13. A method in a mobile device, the method comprising:
receiving an air conduction microphone signal that comprises information representative of a frame of speech;
receiving an alternative sensor signal that comprises information representative of the frame of speech;
estimating an enhanced clean speech value based on the air conduction microphone signal for the frame of speech and the alternative sensor signal for the frame of speech;
providing the enhanced clean speech value directly to another mobile device;
and communicating between the mobile device and a server on a network,
the mobile device instructing the server to use a translation service on the server to translate text from one language to another language based on data sent from the mobile device to the server and,
the mobile device receiving values representing an audio signal from the server, the audio signal representing the translation of the text.

14. The method of claim 13 wherein providing the enhanced clean speech value directly to another mobile device comprises providing the enhanced clean speech value during a one-to-one communication between the mobile device and the other mobile device.

15. The method of claim 13 wherein providing the enhanced clean speech value directly to another mobile device comprises providing the enhanced clean speech value during a one-to-many communication between the mobile device and a plurality of other mobile devices.

16. The method of claim 13 wherein providing the enhanced clean speech value directly to another mobile device comprises providing the enhanced clean speech value during a many-to-many communication between a plurality of mobile devices.

17. The method of claim 13 further comprising communicating between the mobile device and a network of computing devices.

18. The method of claim 17 further comprising communicating between the mobile device and a server on the network of computing devices.

19. The method of claim 18 wherein communicating between the mobile device and the server comprises communicating instant messages.

20. The method of claim 18 wherein communicating between the mobile device and the server comprises communicating information that is shared with another computing device that is in communication with the server.

21. The method of claim 20 wherein the information that is shared comprises changes to an object displayed on the mobile device and the other computing device.

22. The method of claim 21 wherein the information that is shared further comprises audio information.

23. The method of claim 22 wherein the information that is shared further comprises video information.

24. The method of claim 18 further comprising determining a position for the mobile device and communicating the position of the mobile device from the mobile device to the server.

25. The method of claim 24 further comprising using the position of the mobile device to generate a map and communicating the map from the server to another computing device.

26. The method of claim 13 further comprising returning text from the server to the mobile device, the text representing the translation of the text.

27. The method of claim 13 further comprising communicating between the mobile device and another device.

28. A method in a mobile device comprising:
using an air conduction microphone to convert acoustic waves representative of a portion of speech into an electric microphone signal;
using an alternative sensor that detects information representative of the portion of speech separate from the electronic microphone signal to provide an electric alternative sensor signal comprising information representative of the portion of speech;
the mobile device communicating directly with other mobile devices, and the mobile device communicating with a server on a network, wherein
the communication with the server comprises audio, video, and data corresponding to an image of a document that is shared with another computing device, and wherein
the mobile device transmits instructions to the server instructing the server to modify the document based on said instructions and to provide data corresponding to the modification of the document to the other computing device.

29. The method of claim 28 further comprising using a global positioning satellite receiver that is capable of generating a position value indicative of the position of the mobile device.

30. The method of claim 24 further comprising providing the position value to the server.

31. The method of claim 28 wherein the server hosts a speech recognition program and wherein communicating with the server comprises providing audio data to the server and receiving recognized text from the server.

32. The method claim 28 wherein the server hosts a translation program and wherein communicating with the server comprises providing content in one language to the server and receiving a translation in another language from the server.

* * * * *